US012731089B2

(12) United States Patent
Breckenridge

(10) Patent No.: US 12,731,089 B2
(45) Date of Patent: Sep. 8, 2026

(54) SYSTEM AND METHOD FOR ASSOCIATING AND DISPLAYING COMPLEX ASSESSMENT DATA

(71) Applicant: Bear Mountain Endeavours Inc., Dover, DE (US)

(72) Inventor: Douglas James Breckenridge, Aptos, CA (US)

(73) Assignee: Bear Mountain Endeavours Inc.

( * ) Notice: Subject to any disclaimer, the term of this patent is extended or adjusted under 35 U.S.C. 154(b) by 232 days.

(21) Appl. No.: 18/367,304

(22) Filed: Sep. 12, 2023

(65) Prior Publication Data

US 2024/0087194 A1 Mar. 14, 2024

Related U.S. Application Data

(60) Provisional application No. 63/405,860, filed on Sep. 12, 2022.

(51) Int. Cl.
*G06T 11/60* (2026.01)
*G06T 11/10* (2026.01)
*G06T 11/26* (2026.01)

(52) U.S. Cl.
CPC .............. *G06T 11/60* (2013.01); *G06T 11/10* (2026.01); *G06T 11/26* (2026.01); *G06T 2200/24* (2013.01)

(58) Field of Classification Search
CPC ...... G06T 11/60; G06T 11/001; G06T 11/206; G06T 2200/24
See application file for complete search history.

(56) References Cited

U.S. PATENT DOCUMENTS

D741,898 S 10/2015 Soegiono
D759,072 S 6/2016 Siddons
(Continued)

FOREIGN PATENT DOCUMENTS

CN 304663514 6/2018
CN 306085705 10/2020
(Continued)

OTHER PUBLICATIONS chartexpo.com, "Radial Bart Chart", https://chartexpo.com/charts/radial-bar-chart, Apr. 15, 2022 (Year: 2022).*
(Continued)

*Primary Examiner* — Michelle L Sams
(74) *Attorney, Agent, or Firm* — Van Hoven PC; Stefan D. Osterbur; Joshua Van Hoven

(57) ABSTRACT

Methods and systems are provided for providing a combined presentation format to a user interface to facilitate assessments of individuals and/or teams. Example methods and systems may be directed to accessing data set(s) relating to constructs of an individual. Values for the constructs may be determined and normalized based upon comparison data, e.g., of an individual to other individuals. For each of a plurality of components associated with the constructs, component scores may be determined from the normalized plurality of values. Display portions may be generated, e.g., for each construct. The display portions may generally distinguish between the components of each construct based on the component scores for each of the components. Multiple display portions may be provided for simultaneous display at the user interface to allow a visual representation of the individual. Additionally, comparisons of the individuals may be generated based upon the visual representations of multiple individuals.

17 Claims, 17 Drawing Sheets

(56) References Cited

U.S. PATENT DOCUMENTS

| | | | | |
|---|---|---|---|---|
| D766,289 | S | 9/2016 | Bauer | |
| D766,951 | S | 9/2016 | Wang | |
| D780,805 | S | 3/2017 | Van Os | |
| D788,161 | S | 5/2017 | Bauer et al. | |
| D794,675 | S | 8/2017 | Liu | |
| D796,543 | S | 9/2017 | Broughton et al. | |
| D800,769 | S | 10/2017 | Hennessy et al. | |
| D805,550 | S | 12/2017 | Butcher | |
| D819,678 | S | 6/2018 | Liu | |
| 10,013,890 | B2 | 7/2018 | Allen et al. | |
| 10,062,295 | B2 | 8/2018 | Puvanachandran et al. | |
| D832,298 | S | 10/2018 | Joensson | |
| D835,632 | S | 12/2018 | Liu | |
| D836,651 | S | 12/2018 | Butcher | |
| D837,807 | S | 1/2019 | Baber | |
| D842,326 | S | 3/2019 | Broughton et al. | |
| 10,395,548 | B1 | 8/2019 | Levis et al. | |
| D871,422 | S | 12/2019 | Vonnegut | |
| D886,129 | S | 6/2020 | Momchilov | |
| D888,722 | S | 6/2020 | Calzada | |
| D888,732 | S | 6/2020 | Momchilov | |
| D916,875 | S | 4/2021 | Elia | |
| D940,757 | S | 1/2022 | Rondoni | |
| 11,257,587 | B1 * | 2/2022 | D'Angelo | A61B 5/0022 |
| D949,886 | S | 4/2022 | McFarlane | |
| 11,487,802 | B1 | 11/2022 | Klein et al. | |
| D971,938 | S | 12/2022 | Kishore | |
| D986,269 | S | 5/2023 | Bahatyrevich | |
| D993,968 | S | 8/2023 | Leong | |
| D1,007,523 | S | 12/2023 | Endo | |
| D1,015,363 | S | 2/2024 | Imanirad | |
| D1,019,675 | S | 3/2024 | Yang | |
| 2016/0170968 | A1 * | 6/2016 | Allen | G06Q 10/0639 434/322 |
| 2021/0375015 | A1 | 12/2021 | Arden | |
| 2023/0186202 | A1 | 6/2023 | Murriner et al. | |

FOREIGN PATENT DOCUMENTS

| | | |
|---|---|---|
| CN | 307713252 | 12/2022 |
| DE | 4020171009990006 | 8/2018 |
| JP | D1749074 | 7/2023 |

OTHER PUBLICATIONS

Dribble Radial, www.dribble.com, By Andre Oliveira, Retrieved Apr. 29, 2024, posted online May 20, 2013 URL <:https://dribbble.com/shots/1078041-FREEBIE-Flat-Radial-Graph-PSD (Year: 2013).

Presentation Process, www.presentation-process.com, retrieved online Apr. 29, 2024, posted online Jan. 11, 2012 URL <:https://web.archive.org/web/20120111093925/https://www.presentation-process.com/powerpoint-wheel.html (Year: 2012).

Radial Diagram, www.powerslides.com, retrieved online Apr. 29, 2024, posted online Feb. 27, 2021 URL <:https://web.archive.org/web/20210227150000/https://powerslides.com/powerpoint-charts/pie-chart templates/radial-diagram/ (Year: 2021).

Stack Overflow, www.stackoverflow.com, retrieved online Apr. 29, 2024, posted online Jan. 3, 2020 URL <:https://web.archive.org/web/20200103060926/https://stackoverflow.com/questions/45182635/how-to-use-two-datasets-in-chart-js-doughnut-chart (Year: 2020).

International Search Report, Written Opinion of the International Searching Authority and Search Strategy in relation to International Application No. PCT/US2023/032528, dated Jan. 5, 2024, pp. 11.

"Brain PathWays solutions for career development, self-help and self awareness, marriage and family communications, student and learning skills" accessed from http://www.brainpathways.net/index.aspx, accessed on Jan. 10, 2024.

Monty Miller et. al. "Vujade & The Practical Neuroscience of Leadership",2022, pp. 55, Phases I-IV, International Performance Solutions, Ltd., Estes Park, CO.

Monty G. Miller et. al. "The Practical Neuroscience of Leadership, Building Personal and Professional Relationships" 2020, pp. 118, Third Edition, International Performance Solutions, Ltd., Estes Park, CO.

* cited by examiner

200

202 204 206

| | Sensory | | | | | Temperament | | Cognitive | |
|---|---|---|---|---|---|---|---|---|---|
| | Primary | Secondary | Tertiary | Prim:Sec σ | Prim:Tert σ | Trait | σ | Trait | σ |
| MM | V | K | A | 3.65 | 4.98 | I | 2.35 | O | 4.30 |
| DB | KV | | A | 0.20 | 0.50 | I | 1.34 | O | 0.94 |
| SB | V | K | A | 2.03 | 3.74 | I | 2.91 | O | 2.82 |
| AB | K | A | V | 0.50 | 1.42 | E | 0.78 | O | 2.42 |
| SS | K | V | A | 1.83 | 3.01 | I | 1.79 | PO | 0.27 |
| CW | A | V | K | 0.50 | 4.01 | I | 3.25 | P | 1.61 |
| DF | K | A | V | 1.50 | 1.62 | E | 0.56 | P | 0.40 |

Ind. E- *AvkEO*

| Score | A | 0.76v | 1.68k | 1.56E | 0.81O | |
|---|---|---|---|---|---|---|
| Scott | Roger | Mark | Ben | Elliott | Xandra | Laura |
| Δ 3.97 | 0.79 | 2.80 | 3.15 | 3.02 | 5.26 | 5.42 |
| S Δ k -> 1.68K | A = 0.00A | A = 0.00A | K -> 1.68K | A = 0.00A | V → 0.76V | A = 0.00A |
| T E 1.89/ | E , 0.11E | E 2.67/ | E , 0.11E | E , 1.56E/ | E 3.56/ | E 2.24/ E |
| C O ↓ 0.41O | O ↑ 0.68O | O ↓ 0.14O | O ↑ 1.36O | O ↑ 1.36O | O → 0.95PO | O ↑ 1.50O |

700

| Scores | Sensory (S)- Primary | Sensory (S)- Secondary | Sensory (S) - Tertiary | Temperament (T) | Cognitive (C) |
|---|---|---|---|---|---|
| Ind. A | K | v (1.23a) | a (1.68a) | I (0.33a) | [illegible] |
| Ind. B | A | K (0.24a) | v (0.76a) | [illegible] | [illegible] |

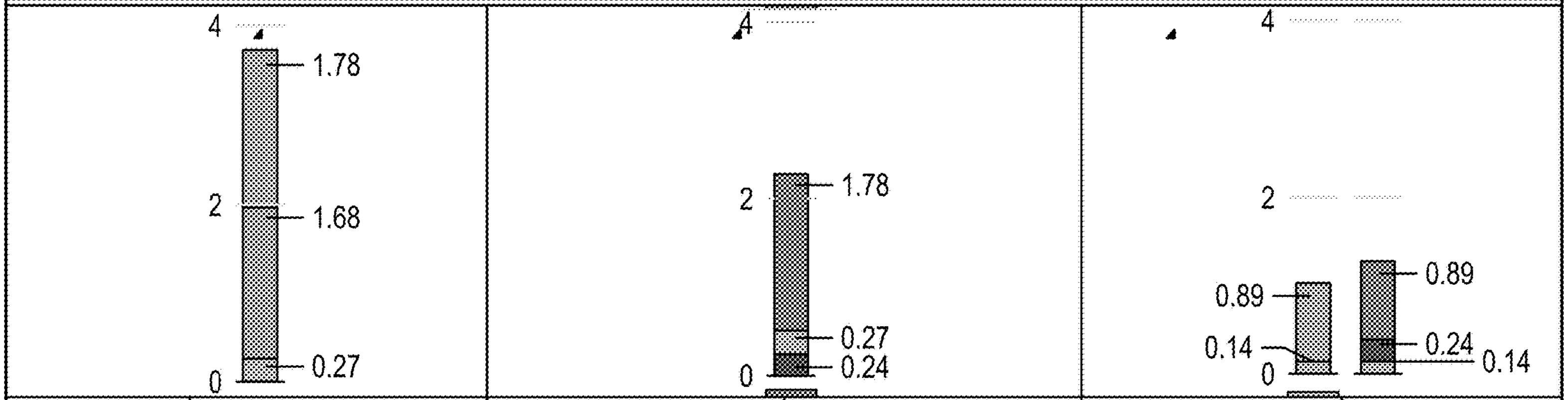

| | | | | | |
|---|---|---|---|---|---|
| Ind. A | Effort - 100% - 3.73a | Ind. A | Effort - 0% - 0.00a | Ind. A | Effort- 45% - 1.03a |
| Ind. B | Effort - 0% - 0.00a | Ind. B | Effort - 100% - 2.29a | Ind. B | Effort - 55% -1.27a |

| | | |
|---|---|---|
| **1 Temperament**<br>Ind. A makes conscious effort (1.78a) from Introvert to Extrovert | **1 Temperament**<br>Ind. B makes conscious effort (1.78a) from Extrovert to Introvert | **1 Temperament**<br>Both make natural effort (0.89a) / Ind. A from Introvert to Extrovert & Ind. B from Extrovert to Introvert |
| **2 Sensory**<br>Ind. A makes conscious effort (1.68a) towards more Auditory | **2 Cognitive**<br>Ind. B makes no effort (0.27a) towards less Outcome | **2 Sensory**<br>Ind. B makes no effort (0.24a) towards more Kinesthetic |
| **3 Cognitive**<br>Ind. A makes no effort (0.27a) towards more Outcome | **3 Sensory**<br>Ind. B makes no effort (0.24a) towards more Kinesthetic | **3 Cognitive**<br>Both make no effort (0.14a) towards Outcome |

| **Difference in Score** | **0.00 - 0.30** | **0.31- 0.99** | **1.00 - 1.99** | **2.00 - 2.99** | **>3.00** |
|---|---|---|---|---|---|
| **Amount of Effort** | No effort | Natural effort | Conscious effort | Significant effort | Extraordinary effort |

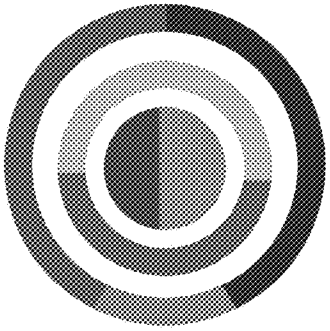

Individual 1

KV (0.0) a (1.73) E (0.17) O (0.41)

Very capable of taking in information by:

- doing both hands-on (touch and feel), and
- seeing (using pictures, charts and graphs), but
- must make conscious effort when discussing (ask questions and listen).

You also have:

- agility to engage with others and personal reflection on the situation

To:

- identify desired outcomes.

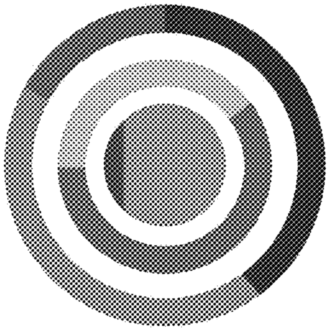

Individual 2

AK (0.25) v (1.83) I (1.02) O (2.48)

Primarily take in information by:

- Discussing (ask questions and listen),
- Strong doing hands-on (touch and feel), and
- must make conscious effort with visual capabilities (using pictures, charts and graphs).

You also have:

- Desire for solitude to engage in deep reflection,

To:

- identify multiple alternatives for desired outcomes, but leaves details to others while monitoring progress.

SYSTEM AND METHOD FOR ASSOCIATING AND DISPLAYING COMPLEX ASSESSMENT DATA

CROSS-REFERENCE TO RELATED APPLICATIONS

This application claims priority to U.S. Provisional Patent Application No. 63/405,860, filed Sep. 12, 2022, and entitled "System and Method for Associating and Displaying Complex Assessment Data," which is hereby incorporated by reference herein in its entirety for all purposes.

BACKGROUND

Assessment tests are used in variety of environments for different purposes, including for assessment of individuals and groups of a variety of sizes and types, such as business organizations, not-for-profits, sports teams, governmental, and the military. Although the results of such tests may provide general utility, for example, in generally identifying individual strengths and aptitudes or understanding interactions and diversity within groups, such results are not directly actionable in a manner that enables concrete applications, such as executing transactions (e.g., approving access to particular real or virtual locations or teams, creation of associations within complex data sets, selecting or generating detailed recommendations for interactions within complex groups, etc.) and actively creating associations and efficiencies within large, complex data sets.

SUMMARY

In at least some example approaches, a method for providing a combined presentation format to a user interface for a user includes accessing at least one data set relating to a first construct of an individual and a second construct of the individual. The method also comprises determining, from the at least one data set, a first plurality of values for the first construct and a second plurality of values for the second construct. The method further includes normalizing the first plurality of values with respect to first comparison data for the first construct. Additionally, the method includes normalizing the second plurality of values with respect to second comparison data for the second construct. The method also includes determining, for each of a first plurality of components associated with the first construct, a first component score from the normalized first plurality of values. The method also includes determining, for each of a second plurality of components associated with the second construct, a second component score from the normalized second plurality of values. Additionally, the method comprises generating a first display portion for the first construct, wherein the first display portion distinguishes between the first components based on the respective first component score for each of the first components. The method also includes generating a second display portion for the second construct, wherein the second display portion distinguishes between the second components based on the respective second component score for each of the second components. The method may further include providing the first display portion and the second display portion for simultaneous display at the user interface.

In another example illustration, a system for providing a combined presentation format for a user is described. The system may include a user interface comprising a display area. The system may also include processing circuitry communicatively linked with the user interface. The processing circuitry may be configured to access at least one data set relating to a first construct of an individual and a second construct of the individual, and to determine, from the at least one data set, a first plurality of values for the first construct and a second plurality of values for the second construct. The processing circuitry may also be configured to normalize the first plurality of values with respect to first comparison data for the first construct, and to normalize the second plurality of values with respect to second comparison data for the second construct. Additionally, the processing circuitry may be configured to determine, for each of a first plurality of components associated with the first construct, a first component score from the normalized first plurality of values, and to determine, for each of a second plurality of components associated with the second construct, a second component score from the normalized second plurality of values. Additionally, the processing circuitry may be configured to generate a first display portion for the first construct, wherein the first display portion distinguishes between the first components based on the respective first component score for each of the first components, and to generate a second display portion for the second construct, wherein the second display portion distinguishes between the second components based on the respective second component score for each of the second components. The processing circuitry may also be configured to provide the first display portion and the second display portion for simultaneous display at the display area of the user interface.

BRIEF DESCRIPTION OF THE DRAWINGS

The above and other features of the present disclosure, its nature and various advantages will be more apparent upon consideration of the following detailed description, taken in conjunction with the accompanying drawings in which:

FIG. 2 depicts an exemplary table of assessment results for a group, in accordance with an embodiment of the present disclosure;

FIG. 7 depicts an exemplary tabular display of different types and levels of "effort" required for teamwork engagement between two members of a group, in accordance with an embodiment of the present disclosure;

FIG. 12 depicts an exemplary comparison matrix of combined radial displays of multiple members of a group, in accordance with an embodiment of the present disclosure;

DESCRIPTION

In example approaches, data sets may be created relating to multiple constructs for one or more individuals. Generally, a construct may include a characteristic, a type of a characteristic, or a set of characteristics that may be employed to assess the individuals, e.g., to determine compatibility of the individuals in working or interacting with each other. In some examples, the constructs may be used to assess a likelihood that a team of individuals can efficiently work together, e.g., as part of a management team, organization, or the like. The data sets may then be accessed to form a visual description of one or more of the individuals, including a plurality of different constructs. For example, a first display portion may relate to a first construct of the individual, while a second display portion relates to a second construct of the individual. In this manner, a plurality of different constructs of the individual may be visually described in a single image or display.

Figure 1:
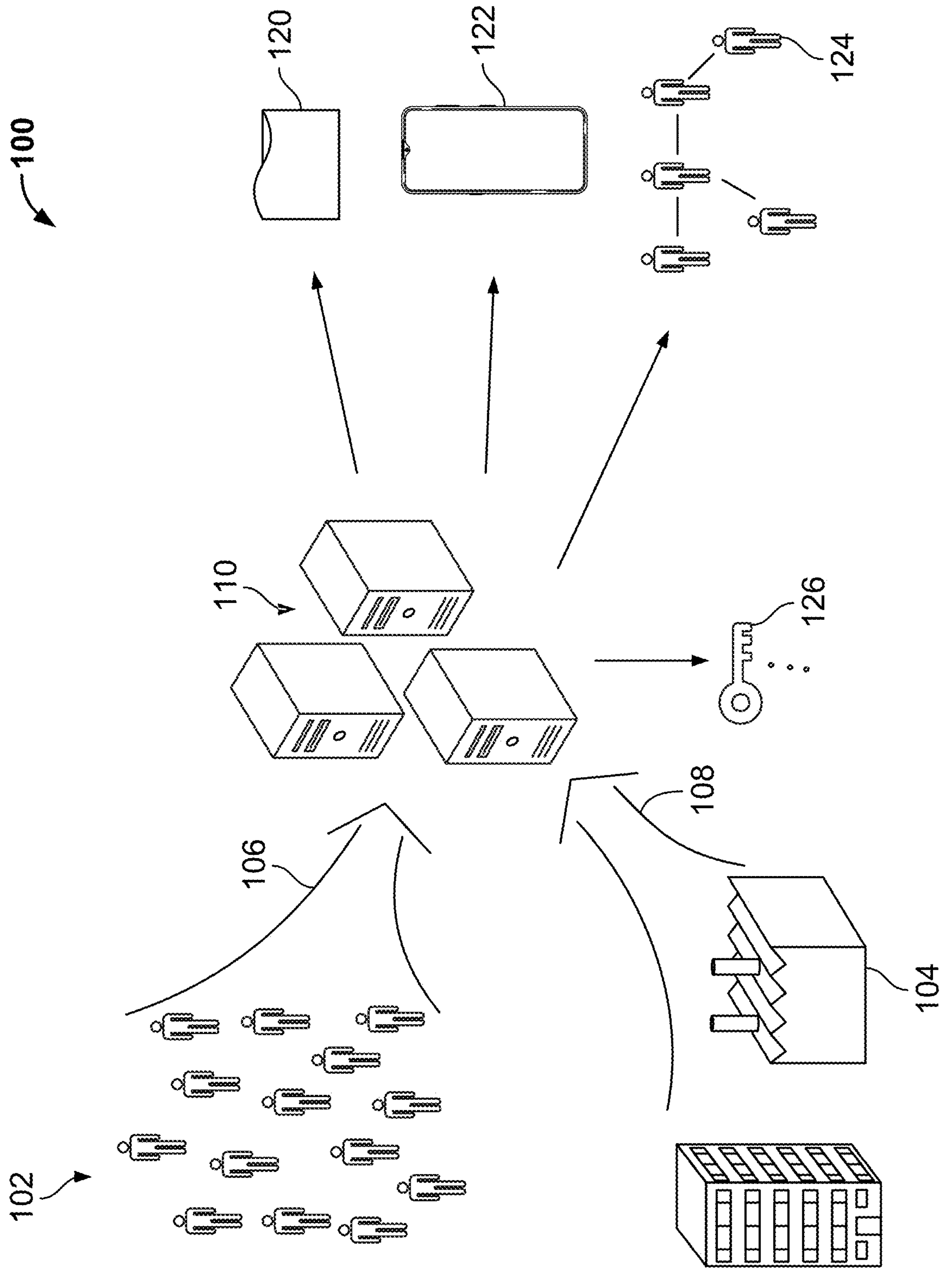
FIG. 1 depicts an exemplary complex assessment system, in accordance with an embodiment of the present disclosure.

Referring now to FIG. 1, an exemplary complex assessment system 100 employing data sets is illustrated and described in further detail. System 100 may compile or collect data relating to individuals 102 in an individual data collection process 106. Data sets may be formed from the collected data which may be analyzed and visually described, e.g., as set forth herein in various examples. The data collection process 106 may establish data set(s) in any manner that is convenient. In at least some examples, one or more assessments may be performed on a user or set of users, e.g., individual(s) 102. For example, one exemplary form of an assessment may be a psychometric assessment test that is provided to a user under certain conditions. An exemplary assessment test may be a selection of questions (e.g., from a stored corpus of available questions) relating to particular constructs within a controlled environment (e.g., delivered electronically with instructions regarding time for testing, acceptable locations and environments, etc.). Questions may be known to have particular associations with particular measured constructs or multiple constructs, with associations having weights and/or other indicators that may be combined with other associations related to the construct or constructs. Scaling, calibration, normalization and presentation may be performed, for example, based on relative responses to related questions or question types, partial redundancies between questions, and responses of other relevant populations (e.g., members of a group under assessment or groups identified by other shared constructs). With appropriate consent received from individuals 102 being tested, other forms of assessment may also be performed in combination with or instead of question-style assessment, such as by performing physical and/or audiovisual tests of aptitudes, 360° assessments (e.g., assessments of an individual or group completed by superiors, peers and subordinates), wearable biometric devices, virtual/augmented reality simulations and experiences, passive collection of data, etc. Information used in creating assessment scores may further be provided in a separate data collection process 108 from centralized (e.g., enterprise based or third-party) data sources 104, such as via analysis of a person's speech, writing, body language, interactions, behaviors, educational records, financial records, work product, reviews, and other similar observational information. Demographic data may also be collected, with user consent, that will be used for analysis and comparative understanding of individuals and sub-groups. As will be discussed further below, each type of source information, as described above, may be scored, calibrated, normalized, and analyzed (e.g., for each data source or in combinations of data sources) in a manner that enables combination with other directly acquired information (e.g., via surveys) for creation of scores for particular constructs.

System 100 may also include one or more servers 110 configured to process data and interface with and store information in databases 120. The databases 120 may include processing and memory or other devices configured to process, provide access to, and storage of one or more data sets relating to the individuals 102. In the system 100, data sets stored in the databases 120 may be accessed by devices 122 (e.g., directly, or as depicted in FIG. 1, via servers 110) to allow review and display of the data and compilations thereof, as well as to control operations, provide access to resources, execute transactions, and the like. Merely by way of example, one or more computing devices such as mobile devices 122 may be in wireless communication with the databases 120 via servers 110. As will be discussed further below, data sets included in the databases 120 may be used to associate individuals 102 to form structured groups 124. For example, based upon analysis of data stored in the databases 120, a group 124 may be formed based upon shared characteristics or other affinity between one or more of the individuals 102.

In addition to providing displays, results, recommendations, actions, and the like to contributing stakeholders (e.g., users, groups, organizations, etc.) the servers 110 and databases 120 may perform processing of large data sets to continuously update aspects of the systems and methods disclosed herein, such as modifying assessments, modifying normalization and computation of assessment results, updating thresholds for when constructs are integrated, updating effort recommendations, and other determinations and displays as described herein. For example, the system may continuously perform assessments and other operations as described herein and, with appropriate permissions, may anonymize the underlying data and associated results for performing data analysis such as application of machine learning to identify additional associations within large data sets. In some instances, assessments and recommendations may be compared to outcomes, for example, based on stakeholder rankings of the success of effort and flexing recommendations, or based on a quantifiable metric of the success of a particular project being executed by a team. Another example of outcome information may be based on artificial intelligence assessments (e.g., based on large language models) of user sentiment, for example, as expressed in directed and/or free form comments related to any of the interactive displays. The underlying assessments and/or effort recommendations may thus be updated and optimized based on real-world results, for example, by an artificial intelligence system modifying weights, questions, effort recommendations, display and other operations and parameters as described herein.

Security protocols 126 may be implemented throughout the system, e.g., restricting access to servers 110, databases 120, and/or analyses and data sets contained therein. For example, certain portions of data, such as raw assessment data, normalized scoring data, organizational rules, transaction-specific rules, instructions for processing such information, and the like may be stored in secure environments having suitable security characteristics by data type, for example, to limit potential access and exposure of critical or sensitive data. Interfaces may be provided to third-party data 104, such as organization or group specific data sources or other assessment providers, via secured channels and protocols.

Referring now to FIGS. 2-12, example approaches of various assessments, analysis of data sets, and visual depictions thereof relating to individuals 102 and enterprises are described in further detail. Generally, in an example assessment, acquired information may be scored for components fitting into constructs of sensory, cognitive, and temperament, although other constructs may be utilized in other embodiments (such as leadership styles, emotional intelligence, etc.). Each construct may have a number of components that are scored in a relative fashion, such as two, three, or four or more components, showing a user's relative preference and/or aptitude for such components within each construct. Although the relative scoring may be performed in other suitable manners, in an embodiment the relative scoring may be on a scale of 0-100, with the total scores of all components for a construct equaling 100. The scores may be calibrated such that the relative scoring of components within constructs provides significant information, for example, such that a difference of "five" between two components has a similar meaning across users and across constructs.

In at least some example approaches, data sets may be normalized to facilitate comparisons between constructs or different individuals. In an example, values of different components of a construct may be normalized based on a standard deviation of each component compared to a base data set for the component. Accordingly, in addition to the foregoing calibration between users, this unique methodology may take data of each individual, team and/or group and may compare them to a large data set (e.g., of other anonymized individuals or users) using such tools such as standard deviation. The results may be further normalized using additional computational tools to allow a true comparison of individuals, teams and groups so that unique attributes and components can be defined to a desired specificity. In an example, a specificity of at least sixty-four (64) decimal places (e.g., a "score") may be used, although any number of decimal places or other measure of specificity may be used that is convenient. It has been found that a specificity of 64 decimal places (or, in some cases more) is a sufficiently large enough number to sufficiently represent differences in user traits statistically in a user database, which may include very large numbers of subjects. For example, a database may include anonymized data of users who have approved their results for generating updating scoring and categorization (e.g., modifying thresholds or weights for various determinations as described herein) that may continue to grow over time. Generally, a greater degree of specificity may allow a greater degree of statistical accuracy, particularly within large populations that may include well over a million individual data sets. Additionally, a degree of specificity may in some cases be balanced with available storage or other computational resources. Given the scoring's specific nature, it can be not only reported as a number, but displayed with a variety of standard graphing diagrams, as will be described further below. In addition to describing procedures for creating multiple complex scores for components within constructs, the present disclosure also describes and depicts user interfaces which enable comprehension and navigation of multiple constructs and underlying components, and underlying information related thereto.

An example of a three-component construct is a sensory construct, having components of kinesthetic, visual and auditory. The sensory construct quantifies how a particular individual takes in and delivers information. Individuals with nearly equal scores (e.g., within 0.30σ, or three-tenths of a standard deviation) for all three components are considered "completely integrated," meaning they are capable of switching between each of these components (usually based on different situations). Based on the scoring and normalization described herein, this is currently defined in a manner such that less than 3% of the population is "completely integrated," although changing thresholds based on newly acquired data and/or particular populations may modify the portion of the population that is completely integrated, and different constructs may have different characterizations for completely integrated individuals. In a three-component construct such as sensory, individuals can also be "integrated," indicating that the individual has a statistically equal preference (e.g., within 0.30σ, or three-tenths of a standard deviation) between two of their three sensory components, indicating that these individuals will usually switch between these two components based on different situations. For a current data set of the general population, for the sensory construct, approximately 23% of individuals are "integrated," although these percentages may change with the collection of additional data, for different populations, and for different constructs. The remainder of the population is "distinct," indicating that the individual has three different ranked preferences for each of the three sensory components, with a primary (highest scored) component, secondary (middle scored) component, and tertiary (lowest scored) component. In the example of the sensory construct, approximately 74% of the currently measured population have distinct sensory scores, although these percentages may change with the collection of additional data, for different populations, and for different constructs. Other example constructs are temperament (e.g., having components of introverted, extroverted, and ambiverted in which the introverted and extroverted scores are within a threshold) and cognitive (e.g., having components of process, outcome, and balanced, in which the process and outcome scores are within a threshold).

Generally, a manner in which individuals 102 may interact with others and/or how they process information may be described by various constructs. While sensory, temperament, and cognitive constructs are generally employed herein, this should not be construed as limiting. Merely by way of example, a single one of these constructs, or multiple other constructs, may be employed in example approaches.

Referring now to FIG. 2, an example table 200 of assessment results for a group of individuals, e.g., collected from individuals 102, is illustrated and described in further detail. Table 200 includes data relating to a plurality of different constructs. More specifically, in the example illustrated the table 200 includes a sensory construct column 202, a temperament construct column 204, and a cognitive construct column 206. Data for seven different individuals 102 (represented by different two-letter initials in the left-most column) is represented in the table for the sensory, temperament, and cognitive constructs. Within the sensory construct column 202, the kinesthetic, visual and auditory components are represented as being either primary, secondary, or tertiary components for the individual. Additionally, ratios of the normalized values for the primary/secondary component and the primary/tertiary component are also given for each individual, to thereby to indicate a degree to which the three components of the sensory construct are present for each individual. The temperament construct column 204 indicates whether the individual is introverted (I), extroverted (E), or ambiverted (IE), as well as a standard deviation of the individual indicating the degree to which the individual is extroverted or introverted. The cognitive construct column 206 indicates whether the individual is process-oriented (P), outcome-oriented (O), or balanced between the two (PO) if within a threshold.

The scoring and normalization, and the depictions thereof, described and depicted herein enables accurate, granular comparisons between individuals and for larger groups in a format that may provide a comprehensive understanding of complex information within a single view. For example, the normalized values listed in table 200 of FIG. 2 provides relative information of each individual across three separate constructs, with each construct having multiple components. Comparisons within constructs can be performed not only between which components are primary, secondary, tertiary, etc., but the degree of the difference between individuals can be directly assessed and scored. This depth of analysis results in granularity of reporting an individual, group or sub-group score(s) such that the reporting reflects the vast diversity of human behavior versus tradition psychometric instruments which categorize individuals by specific, finite and limited categories. This distinction begins to lend itself to better describing human neurodiversity, for example, such that people experience and interact with the world around them in many different ways, such that individuals and groups are managed such that there not a right or wrong way of thinking or acting, and further that understanding and engaging with neurodiversity results in better outcomes.

Figure 5:
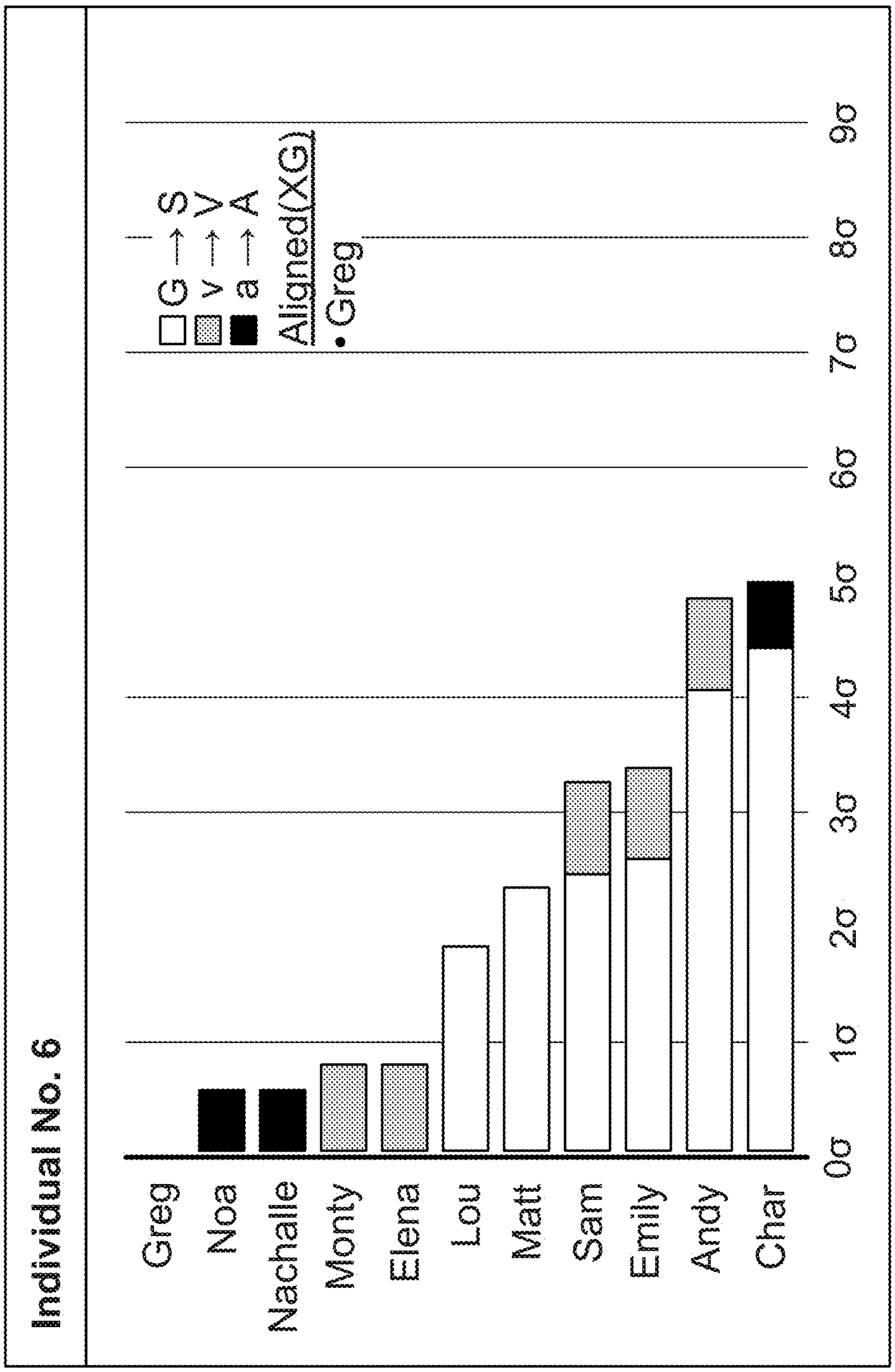
FIG. 5 depicts an exemplary bar chart of different types and levels of "effort" required for teamwork engagement between a member of a group and other members of the group, in accordance with an embodiment of the present disclosure.
Figure 6:
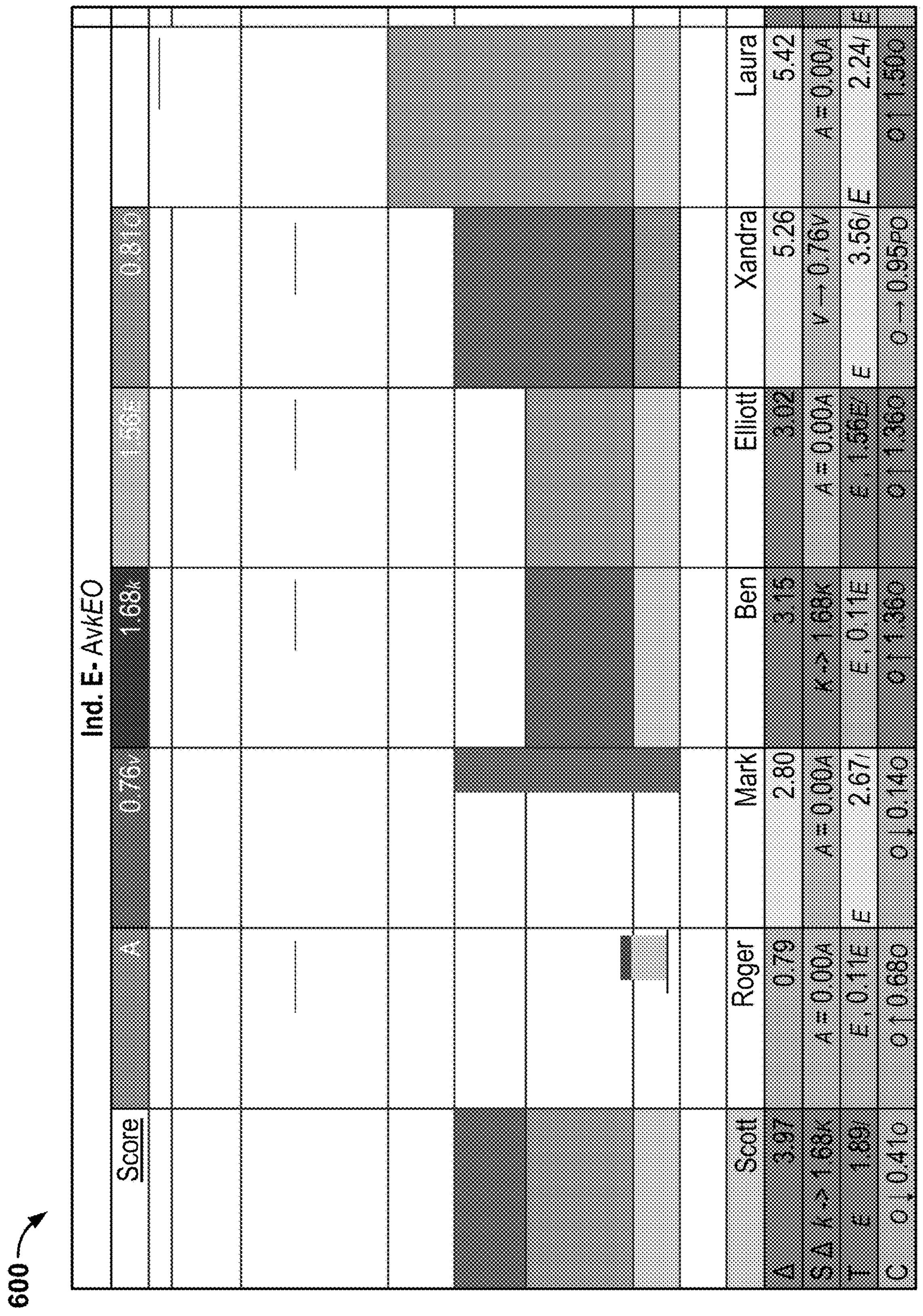
FIG. 6 depicts an exemplary tabular display of different types and levels of "effort" required for teamwork engagement between a member of a group and other members of the group, in accordance with an embodiment of the present disclosure.

In addition, the specificity of scoring contributes to a second level of analysis which allows further detailed individual, group and sub-group comparisons calculated through multi-factor rationalization such that users can prioritize and understand the specific, measurable range between themselves and others so as to prioritize and evaluate the effort needed to overcome differences (and obversely, leverage neurodiversity) as well as appreciate shared construct components signifying the ease of relationships due to their homogeneity (and understand potential biases). In addition to the particular depiction provided in FIG. 2, additional cues such as colors, shapes, emphasis, and the like may provider further shorthands for assessing complex information about individuals and groups. Each of the views depicted herein may be accessed via other views, for example, based on appropriate click-throughs on an individual, construct, component, or the like. For example, clicking on the sensory construct within the column 202 may provide options for comparative depictions for the group, such as the comparative radial depictions of FIG. 3. Clicking on or between the temperament construct of column 204 and the cognitive construct of column 206 may provide an option for a comparative graphical view of these two constructs, for example, as depicted in FIG. 4. Selecting an individual or group of individuals my provide various options, such as "effort" comparisons between a particular individual and all other individuals in the group or team (e.g., as depicted in FIGS. 5-6), effort comparisons between two individuals (e.g., as depicted in FIGS. 7 and 12), and individual results interfaces, such as the single and integrated radial depictions of FIGS. 8-11.

In at least some examples, a visual relationship is provided between different components of a construct for individuals. Additionally, as will be described further below visual relationships of multiple components of multiple constructs may be displayed together.

Figure 3:
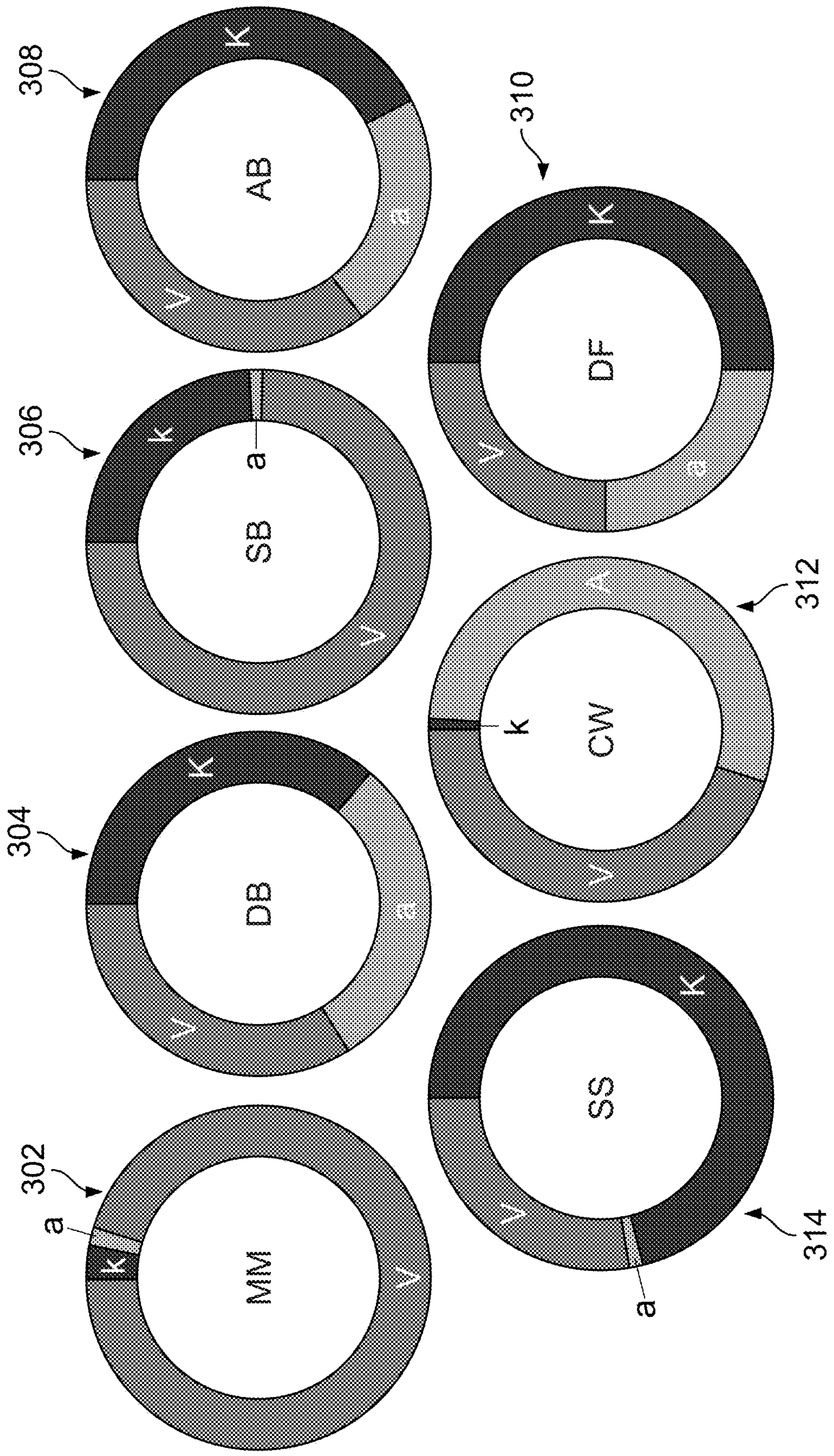
FIG. 3 depicts exemplary sensory radials for the group of FIG. 2, in accordance with an embodiment of the present disclosure.

Referring now to FIG. 3, a visual relationship of different components of a single construct for each individual listed in the table 200 of FIG. 2 is illustrated and described in further detail. In FIG. 3, the radials 302-314 each provide a visual representation of the normalized values for each of the three components (i.e., kinesthetic/k, visual/v and auditory/a components) as a proportion of a whole for each individual. More specifically, radial 302 relates to individual MM, radial 304 relates to individual DB, radial 306 relates to individual SB, radial 308 relates to individual AB, radial 310 relates to individual DF, radial 312 relates to individual CW, and radial 314 relates to individual SS. By providing color coding, shading, text, call-outs, and other related methodologies of emphasizing and/or focusing on particular components or subsets of individuals, multiple types of comparisons may be made. For example, menus and interfaces may provide for reordering, grouping, or clumping of the radial depicts based on strength of a particular component, or degree of integration (e.g., complete or partial integration), etc. Radial portions or integrations may be "pulled out" and compared individually, for example, nesting results from highest to lowest. As with each of the display views depicted herein, clicking on an individual, subset of individuals, component, or the like, may provide for a variety of options for navigating to other related views. For example, in the context of any of the displays, a variety of options for selection may be provided based on where a user's attention is directed (e.g., based on cursor position, gaze tracking, etc., directed toward any portion of a display) and any user input (e.g., directed toward a selection of the portion of the display), such as menus, displaying the selected item for any individual or group, narrative displays (e.g., describing a construct and components, results, recommendations for flexing within individuals and groups, etc.), and other related information as disclosed herein. Moreover, each interactive display may include options to provide directed (e.g., likes, rankings, etc.) or free-form commenting on any element of an interactive display, or on the interactive display generally.

Figure 4A:
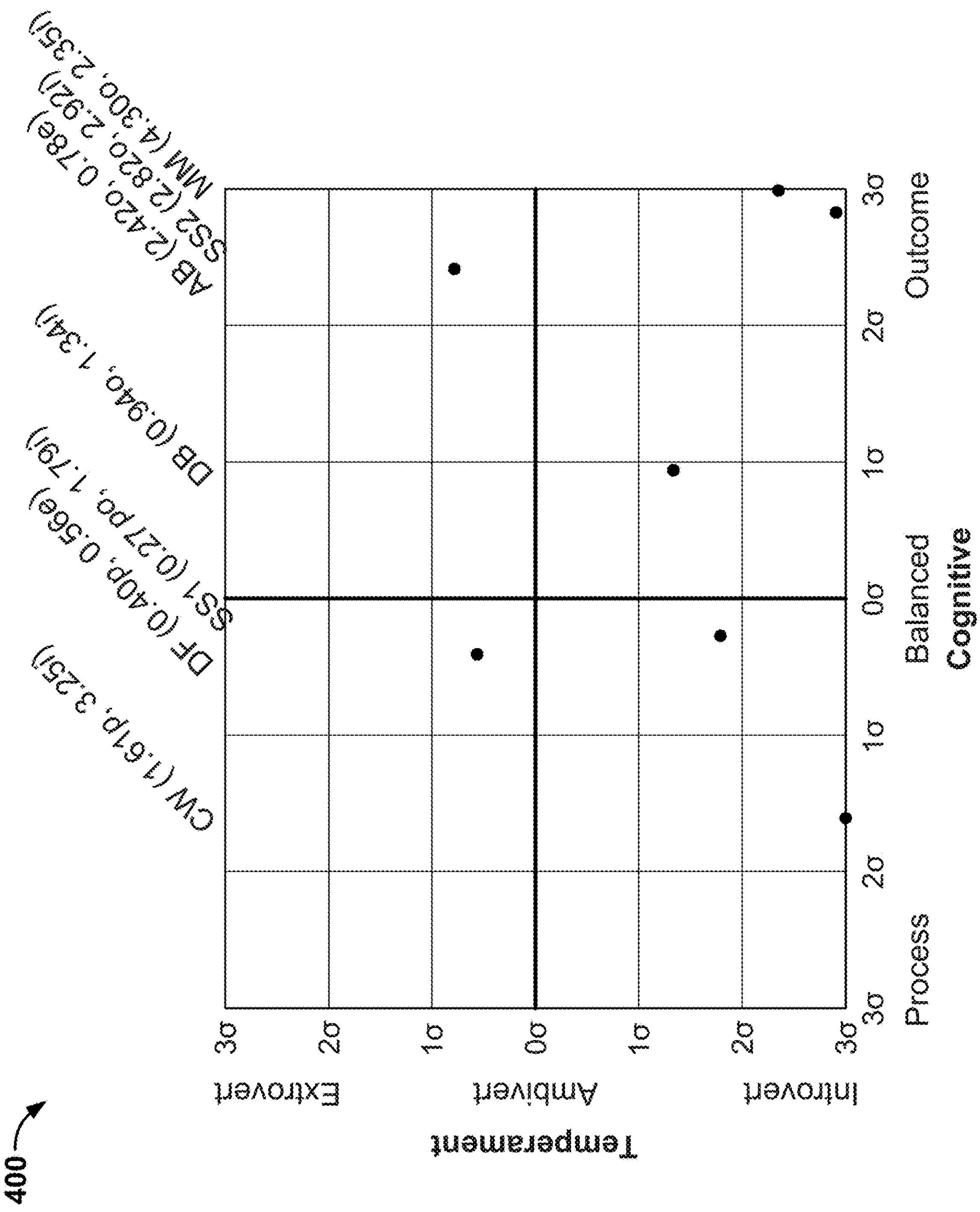
FIG. 4A depicts an exemplary plot of temperament vs. cognitive results for the group of FIG. 2, in accordance with an embodiment of the present disclosure.

Referring now to FIG. 4A, an exemplary plot 400 of temperament vs. cognitive results for the group of seven individuals introduced above and discussed in FIGS. 2 and 3 is illustrated and described in further detail. Generally, for each of the seven individuals (again identified by their two-letter initials), temperament balance is plotted on the y/vertical axis versus cognitive balance on the x/horizontal axis. Furthermore, each is scaled according to a number of standard deviations from a balanced location or zero with respect to each axis. In this manner, the seven individuals may be located in four quadrants of process-oriented introverts (CW and SS1), outcome-oriented introverts (DB, SS2, and MM), process-oriented extroverts (DF), and outcome-oriented extroverts (AB). The plot 400 may be utilized as another basis of comparison or categorization of select groups of individuals 102, e.g., that are part of a group of interest and have granted appropriate permissions for data sharing. Permissions may be granted at a variety of levels of granularity, for example, to allow display of effort recommendations, effort scores, radials, underlying scores, responses to assessments, etc. In some embodiments, permissions may be based in part on the role of user accessing information. For example, a team leader, supervisor, human resources representative, coach, etc., may have access to all or most information of a particular group of interest where the group members have given informed consent to such access. As with each of the display views depicted herein, clicking on an individual, subset of individuals, component, or the like, may provide for a variety of options for navigating to other related views.

Figure 4B:
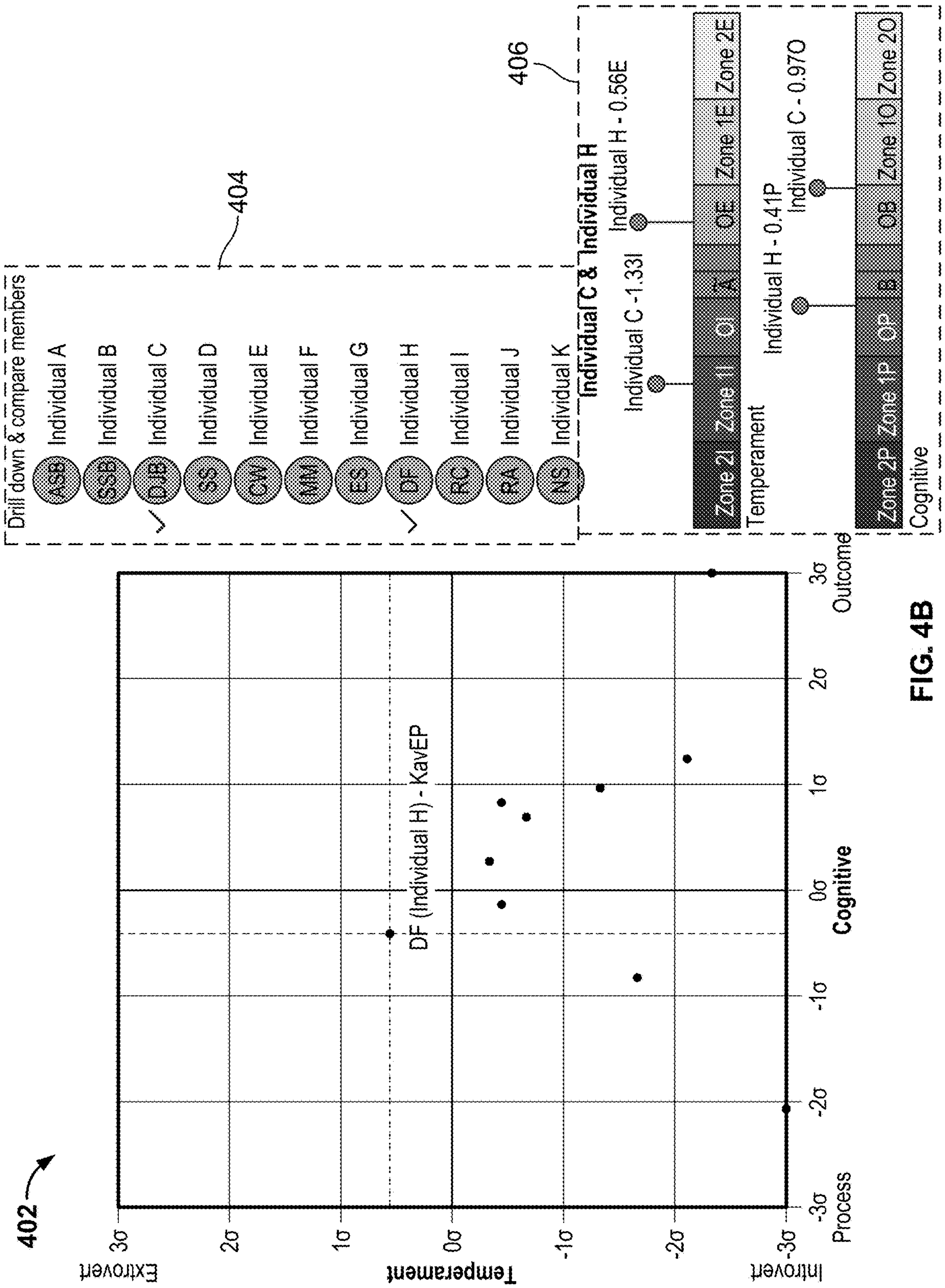
FIG. 4B depicts an exemplary plot of temperament vs. cognitive results for another group of individuals, and illustrates additional information that may be displayed in response to user selection(s), in accordance with an embodiment of the present disclosure.

In at least some example approaches, a visual representation, e.g., plot 400, may allow for display of information in response to a user selection on the visual representation or plot. For example, as illustrated in FIG. 4B, plot 402 is illustrated that selectively provides additional display fields 404 and/or 406 in response to a user selection of one of the data points illustrated in the plot 402. In the example illustrated, a user selection of data points within plot 402 and/or names of individual(s) within display field 404 may cause the appearance of an additional display field 406. Additionally, selection of two individuals, e.g., by touching or selecting appropriate names and/or data points, may create a comparison of the two individuals as seen in display field 406. In the example display field 406, a comparison of temperament and cognitive traits is illustrated for Individual C and Individual H. More specifically, the display field 406 indicates that Individual C is more introverted than Individual H by 1.89 standard deviations (i.e., 1.33+0.56=1.89).

These comparison scores, e.g., as illustrated in Table 200 of FIG. 2, radials 302-314 of FIG. 3, and plot 400 of FIG. 4, can be applied across different groups and sub-groups of individuals to facilitate comparisons of individuals, which may be utilized in determining formation of teams of individuals 102. For example, comparison scores may be performed for multiple individuals in a group and for sub-groups, for example, vis-à-vis all other group members, portions of groups having similar scores (e.g., sub-groups), individuals compared to aggregated scores of sub-groups or the group as a whole, and all variations of individuals, sub-groups, and groups as a whole. In this manner, the system developed enables group dynamics to be quantified and accurately predicted, including providing concrete instructions for assignment of roles, tasks, authorizations, etc. within a group. Group and/or sub-group needs can be identified based on desired outcomes. For example, certain group tasks may be identified as having better outcomes when a diverse but overall at equilibrium type group profile is obtained, for example, with nearly standard overall scores but divergence in individual scores, with multiple individuals with integrated/balanced/ambiverted components, multiple individuals with distinct components, and a variety of emphasized components within the distinct individuals. Other group tasks may have better outcomes where particular components are shared between group members.

Performance of particular team profiles may be observed and quantified, to identify the respective mix of components, constructs and group (sub-group) dynamics (e.g., recognizing group communication styles, leveraging group tensions in process/outcome orientation, introvert/extrovert behaviors that affect spontaneity and risk aversion, etc.) that result in successful performance of particular tasks. For example, specific desired outcomes (e.g., meeting particular deadlines, measures of quality of work product, stress and health of individuals within the group, etc.) may be measured and quantified, and compared with the respective construct and component scores of the groups, sub-groups, and individuals. In this manner, predictive guidance may be used to identify combinations of constructs and desired components for a group, etc. In this manner, this system enables groups and sub-groups to be actively assessed and modified in real-time, and future group assignments and constructs can be dynamically modified.

The individual and group scoring described and depicted herein may be utilized to authorize and/or perform a variety of physical and/or electronic transactions. For example, in virtual environments, access to particular electronic resources and systems may be granted based on respective scores, for example, in the dynamic formation and maintenance of sub-groups within teams. Based on known distributions of components within constructs, communications, instructions, and particular resources may be deployed to individuals, groups, and sub-groups (e.g., by generating auditory instructions via a speaker for an individual having a strong auditory component for their sensory construct, interactive activities/games for an individual having a strong kinesthetic component, providing specific reserved instances within a virtual meeting for an individual with a strong introvert component to speak in a group with multiple strong extroverts, etc.).

The present disclosure is also applicable to a variety of third-party situations. For example, supplier and vendor engagement, as well as employees or groups of employees who interact with such third parties, may be determined based on scores of components within constructs, and combinations thereof. Groups such as corporate or non-profit boards may be selected to achieve a collection of desired components and combinations of components, and to have minimum levels of neurodiversity to facilitate decision-making and skill sets that address a variety of situations. Scoring of third parties may be used for a variety of transactions, such as assignment of teams for joint venture projects. Further, the information described and depicted herein can be utilized entirely by third parties, such as providing the testing and reporting for sale to individuals to be utilized for a variety for purposes, such as providing to potential employers, etc. Results may also be used directly, such as for corporate or personal relationship alignment.

The scoring and normalization described herein enables the rationalization and efficient utilization of relevant data storage resources. Normalized scores allow for direct comparison and data linking without regard to underlying data sources, reducing the need to store large quantities of likely sensitive and highly confidential data. Once scores are determined, underlying information used to determine scores can be permanently deleted and/or obscured. The present systems and methods provide for more secure access and distribution of sensitive information, including by not needing to permanently store underlying data, distributing only information pertinent to a particular individual or group to remote systems and devices, and by appropriately providing for access to physical, electronic, and virtual resources. Individual users have complete control of their own data such that they must give consent to share their information with any and all parties (e.g., components, data, scores, demographics, etc.).

Referring now to FIG. 5, an example of a comparison of an individual to other individuals is illustrated and described in further detail. More specifically, FIG. 5 depicts an exemplary bar chart 500 of different types and levels of "effort" required for teamwork engagement between a given member of a group (Individual No. 6) and other individuals. In an example, this comparison may be generated to determine how "easy" it may be for Individual No. 6 to work with the other listed individuals. Effort may be determined based on comparisons between individuals' constructs and components in accordance with a particular weighting/comparison criteria. In some instances, the comparisons may simply be a summation of differences or deltas within each construct, with more commonality resulting in less effort required. In other instances, different constructs and/or components may be weighted differently, for example, with differences in temperament weighted more than other constructs. Generally, as illustrated in the chart 500, Individual No. 6 is indicated as being "aligned" with "Greg." The remaining individuals are listed in ranked order of overall alignment based upon summation of differences in the sensory, temperamental, and cognitive constructs. As with each of the display views depicted herein, clicking on an individual, subset of individuals, component, or the like, may provide for a variety of options for navigating to other related views.

Referring now to FIG. 6, an exemplary tabular display 600 is illustrated, which describes different types and levels of "effort" required for teamwork engagement between a given individual and other individuals, e.g., who are collected as members of a group or potential group. More specifically, display 600 provides a visual representation of "Individual E" and a comparison of normalized component scores across sensory, temperament, and cognitive constructs with other individuals. The display 600, for example, includes visual representations or comparisons of component scores of Individual E to the other individuals (Scott, Roger, Mark, Ben, Elliott, Xandra, and Laura). In this manner, a representation may be provided to indicate how "far" away component scores are from the other individuals for Individual E, e.g., by a numerical "delta" of each component score of Individual E from the component scores of the other individuals. In the example illustrated, an overall "delta" is listed as the sum of the standard-deviation difference for each of three constructs. In the display 600, the three constructs are the "sensory" construct (indicated as "S," and having one of the kinesthetic ("k"), visual ("v"), auditory ("a"), or integrated indications), the "temperament" construct ("T," with introvert (I), ambivert (A), or extrovert (E), and the cognitive construct ("C," with process ("P"), balanced ("PO"), and outcome ("O"). It should be noted that the nomenclatures in the provided illustrations are illustrative, and other nomenclatures for traits and/or constructs may be employed. Merely by way of example, "B" may be used to indicate a cognitively balanced individual instead of "PO." As can be seen in display 600, Individual E is most different from "Laura," having a delta sum of 5.42, and most similar to "Roger," having a delta sum of 0.79. As with each of the display views depicted herein, clicking on an individual, subset of individuals, component, or the like, may provide for a variety of options for navigating to other related views.

FIG. 7 depicts an exemplary tabular display 700 of different types and levels of "effort" required for teamwork engagement between two members of a group. In the display 700, a comparison is made for sensory, temperament, and cognitive constructs between "Individual A" and "Individual B." In the left-most main column of the display 700, Individual A is shown to make conscious effort to work with Individual B in respect of Individual B's more extroverted and auditory nature, while making no effort toward being more outcome-oriented. Generally, display 700 provides an illustration that demonstrates how each individual must flex to best align with the other individuals' based upon the traits of both. The first column provides an indication of Individual A exerting 100% effort to align with Individual B's traits (with Individual B making no effort). The second column, conversely, provides an indication of Individual B exerting 100% effort to align with Individual A's traits (with no effort by Individual A). The third column is when both individuals attempt to align with the most efficient effort exerted as a team (sometimes that is 50% effort by Individual A and 50% effort by Individual B, but sometimes it requires more effort by one individual to be the most efficient as a team). In addition, the narratives illustrated may be prioritized, e.g., as shown in display 700, for each column with the most important construct to focus on at the top, the second below it, and the least important at the bottom. As with each of the display views depicted herein, clicking on an individual, subset of individuals, component, or the like, may provide for a variety of options for navigating to other related views.

A variety of effort recommendations may be made between two or multiple individuals. In one example, an "optimal" effort recommendation may be made to minimize the overall effort required for the individuals to work optimally together. In an example of a three or more component construct, this optimal recommendation may be based on which individual can most easily flex to accommodate the other individual's primary component. In an example of more than two individuals, the optimal recommendation may balance overall differences or desired team dynamics. In some instance, the optimal effort recommendation may not be based on exactly balancing the constructs of individuals but may be targeted to another particular outcome, such as a particular task in which individuals should be primarily outcome focused while balancing components within other constructs.

Figure 8:
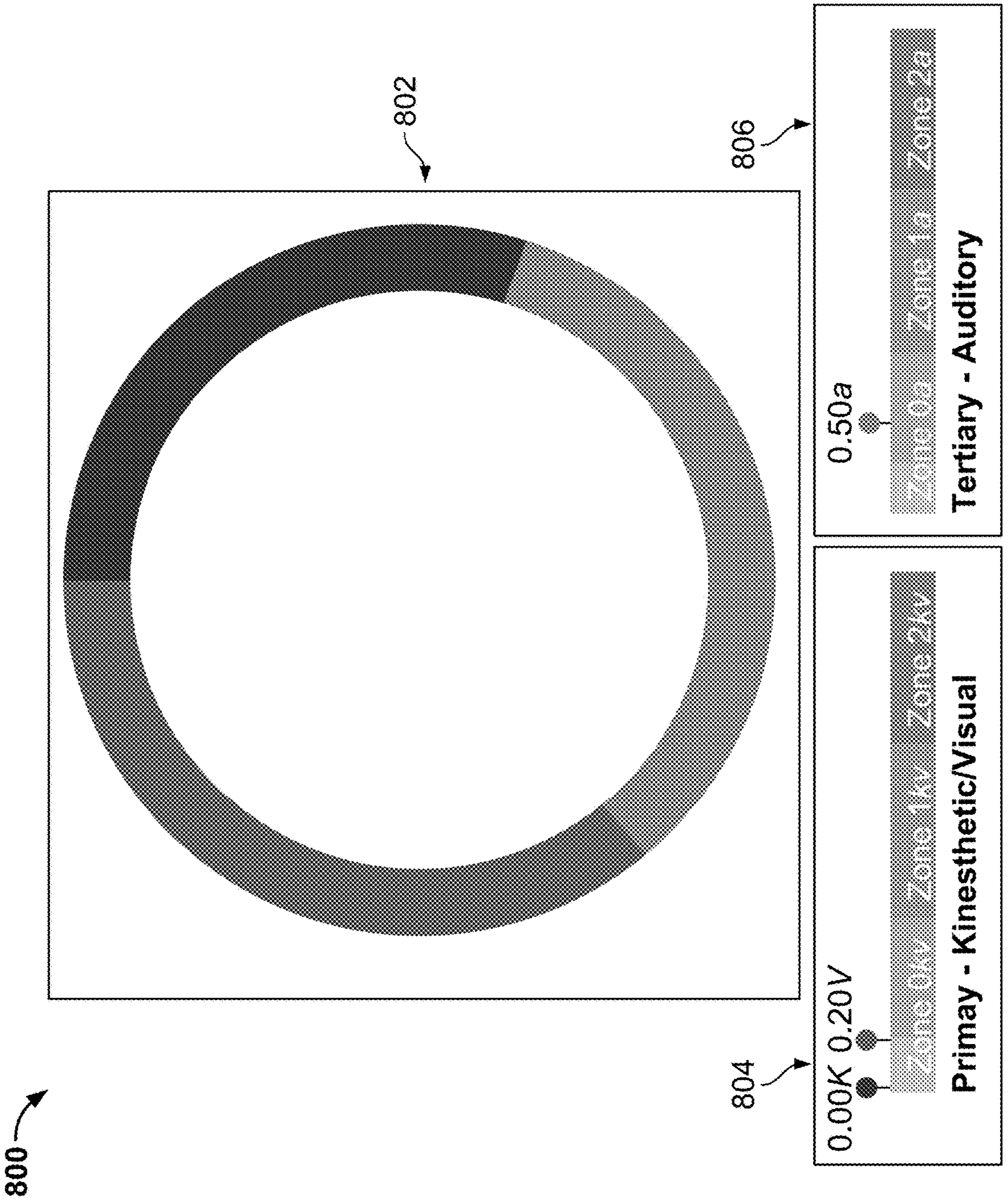
FIG. 8 depicts an exemplary sensory radial and characteristic zone display, in accordance with an embodiment of the present disclosure.
Figure 9:
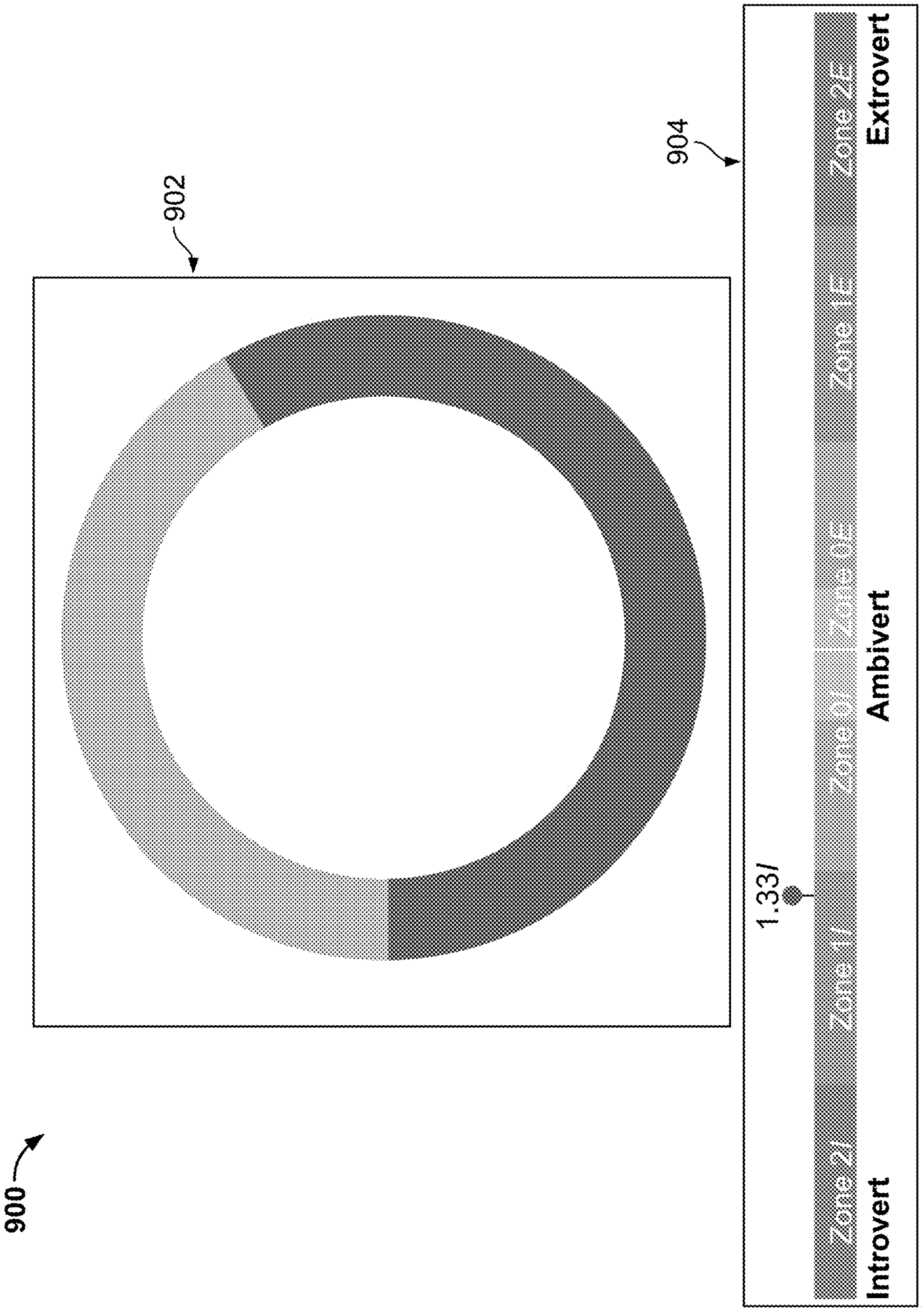
FIG. 9 depicts an exemplary temperament radial and characteristic zone display, in accordance with an embodiment of the present disclosure.
Figure 10:
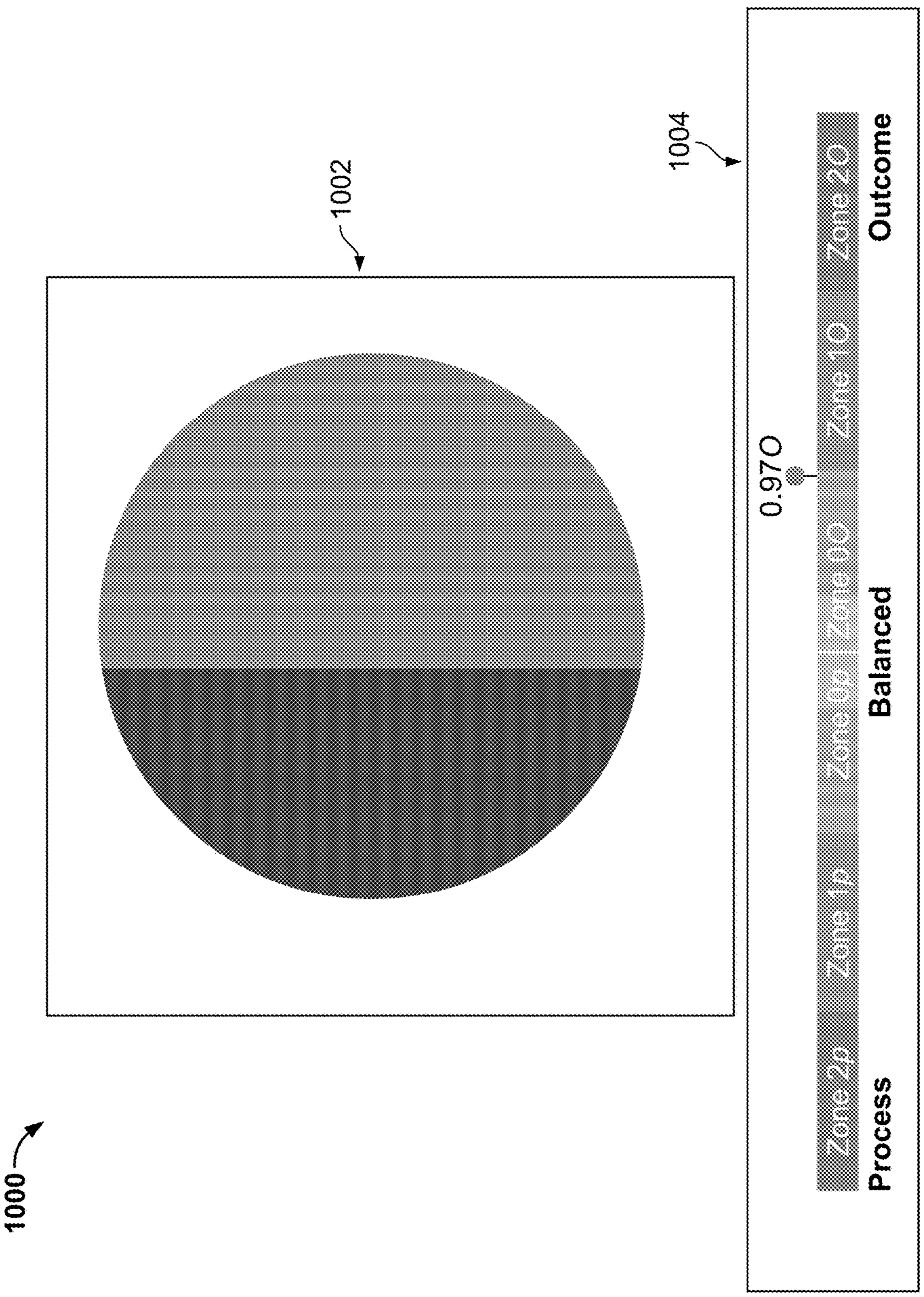
FIG. 10 depicts an exemplary cognitive radial and characteristic zone display, in accordance with an embodiment of the present disclosure.

As illustrated above in FIG. 3, a visual relationship of multiple components of a single construct for an individual may be provided in the form of radials 302-314, which can illustrate a proportional relationship of normalized values for the components. More specifically, in the example radials 302-314, an individual's relative strength of the three components in a sensory construct (i.e., auditory, visual, and kinesthetic) may be visually represented by a circumferential extent of corresponding portions of the radials. Turning now to FIGS. 8-10, illustrative examples are provided of additional information that may be displayed in response to user selections in conjunction with a combined visual display of radials such as the radials 302-314.

In this manner, a combined depiction of constructs and components may be provided via a new, combined presentation format such as a combination of a radial and circle visualization. An exemplary combined presentation format includes a plurality of visual indicators adjacently nested, such that all or a desired subset of constructs and components can be viewed simultaneously. Although a variety of shapes (e.g., radials, circles, ovals, squares, rectangles, polygons, or combinations thereof) and locations (e.g., nested, adjacent, superimposed, etc., or combinations thereof) and distinguishing formats (e.g., different colors, shading, cross-hatching, etc., or combinations thereof) may be utilized in different embodiments, in an exemplary embodiment of a radial presentation format, nested radials (e.g., defined by respective internal and external radii) and an internal circle may be provided for constructs (e.g., for each of the sensory, temperament, and cognitive constructs), with each of the components being visually distinct within the respective radial or circle portion. For example, an external radial may surround the other radial and circle portions and may correspond to the sensory construct, with each of the respective components having distinct colors, for example, corresponding to kinesthetic, visual, and auditory, respectively, and encompassing a portion of the radial that corresponds to the respective score for each component. A middle radial may be surrounded by the external radial and may correspond to the temperament construct, with distinct colors (e.g., including distinct colors with respect to each other and in comparison to the colors of the components for the sensory construct) for each of the extroverted and introverted components, and encompassing a portion of the radial that corresponds to the respective score for each components. A center circle construct may be surrounded by the external and middle radials and may correspond to the cognitive components, with distinct colors (e.g., including distinct colors with respect to each other and in comparison to the colors of the components for the sensory and temperament constructs) for each of the process and outcome components, and encompassing a portion of the middle circle that corresponds to the respective score for each component. This combined presentation format is not limited to one circle and two radials, but the number of radials may expand and contract based on the number of constructs being analyzed, compared and presented.

Providing a combined presentation format (e.g., in a radial/circle format) for all of the constructs and components allows, within a single and easy to comprehend view, a holistic understanding of all of an individual's components and constructs thereof, and enables and understanding as to how particular constructs and components interact for the individual and groups (including measurable differences within all components based on situational individual and group behaviors due to their elasticity within each construct). Comparisons between individuals and holistic understandings of group dynamics are enhanced by consideration of combined presentation format information relative to each other, for example, by simultaneously viewing radials for groups and sub-groups.

A combined presentation format (e.g., a radial and circle) provides a core user interface element for quickly accessing information and performing analysis for individuals, groups, and sub-groups. For, example, any component of a radial may be selected (e.g., by clicking, hovering, touching, eye-gaze, gesture, or providing another suitable input) and options may be provided, such as to tunnel down to detailed data, identify potential groups or subgroups that have similar or complementary constructs or to display comparison information for individuals within the group, recommendations for additions or modifications to groups, recommendations for tasks and transactions. Because the radial or circle provides information for all constructs and components, any of the user interfaces depicted herein, and combinations thereof, can be accessed directly from the radial/circle and a relatively small number of options, such as for individual analysis, comparison analysis, group analysis, transaction and/or task analysis, situational analysis, and the like. In this manner, the combined presentation format (e.g., radial and circle) provides not only an efficient way to concurrently view multiple components and constructs thereof, but also to access additional information about the constructs, components, comparisons, and groups.

In a first example illustrated in FIG. 8, additional information may be displayed in response to user selections made via user display interface 800. More specifically, user display interface 800 may include a radial 802. Radial 802 provides a visual representation of the three components of a sensory construct, similar to radials 302-314 described above in FIG. 3. Accordingly, radial 802 includes three portions representing the auditory, visual, and kinesthetic components of the sensory construct. The three portions extend circumferentially to represent relative proportions of normalized values associated with each component of the sensory construct. The radial 802 may be provided visually at a user interface, e.g., a touchscreen or display of mobile device 122. In response to a user selection, e.g., of one of the portions, additional information relating to one or more of the components may be displayed. For example, selection of the largest portion of the radial 802 may cause additional sensory data display area 804 to appear, providing additional descriptive data relating to the primary component (in the illustrated example, the kinesthetic and visual components are each primary components, being generally equal within a threshold amount). Additionally, selection of one of the smaller portion(s) of the radial 802 may cause additional sensory data display area 806 to appear, providing additional descriptive data relating to a secondary and/or tertiary component (in the illustrated example, the auditory component is the tertiary component of the sensory construct). In example approaches for displaying additional information as described herein, selections may be received via any suitable interface such as a touchscreen, computer mouse, audible instruction, AR or VR interface (e.g., utilizing vision tracking or remote gesturing), and the like, e.g., such that a user may receive additional information relating to a component of a construct by "touching" or otherwise selecting the portion of the radial relating to that component. In this manner, a user selection may be made at a location within a display portion, e.g., radial 802. In the embodiment depicted in FIG. 8, a user's relative score compared to the general population, depicted on an appropriate scale (e.g., in FIG. 8, by standard deviations relative to an overall statistically significant population), may be shown and allocated to respective zones. In the exemplary embodiment depicted in FIG. 8, the individual is integrated with nearly identical scores for two of the components (e.g., kinesthetic and visual) of the sensory construct (e.g., compared to a user who has equal kinesthetic, auditory and visual scores, at least within a threshold, and thus may be referred to as "completely integrated"), and thus, falls relatively close to the average scoring for two of the three components. In the particular example depicted in FIG. 8, the auditory score may also be relatively close to average, but not so close that the individual is completely integrated.

Referring now to FIG. 9, an exemplary temperament radial and characteristic zone display 900 is illustrated and described in further detail. The temperament radial and characteristic zone display 900 includes a radial 902 relating to a temperament construct of an individual. Accordingly, circumferential portions of the radial 902 indicate a degree to which the individual is introverted or extroverted (or ambiverted, when equally introverted/extroverted within a threshold). Selection by the user of either portion of the radial 902 may activate display of additional temperament data display 904, which provides additional visual or numerical information regarding the temperament construct of the user. In the example illustrated, a scale is provided illustrating that the individual corresponding to the radial 902 is introverted by 1.33 standard deviations (i.e., away from being evenly introverted and extroverted, or fully "ambiverted").

Referring now to FIG. 10, another example illustration is provided of an additional display portion or area that may be provided in response to a user selection. More specifically, FIG. 10 depicts an exemplary cognitive radial and characteristic zone display 1000. The display 1000 includes a cognitive radial 1002, which displays two portions of the radial 1002 to represent a given individual's balance between being process-oriented and outcome-oriented. Selection of one or both proportions of the radial 1002 may activate display of an additional cognitive zone 1004, which provided further data relating to the process/outcome orientation of the individual. In the illustrated example, the individual is outcome oriented by 0.97 standard deviations.

Figure 11:
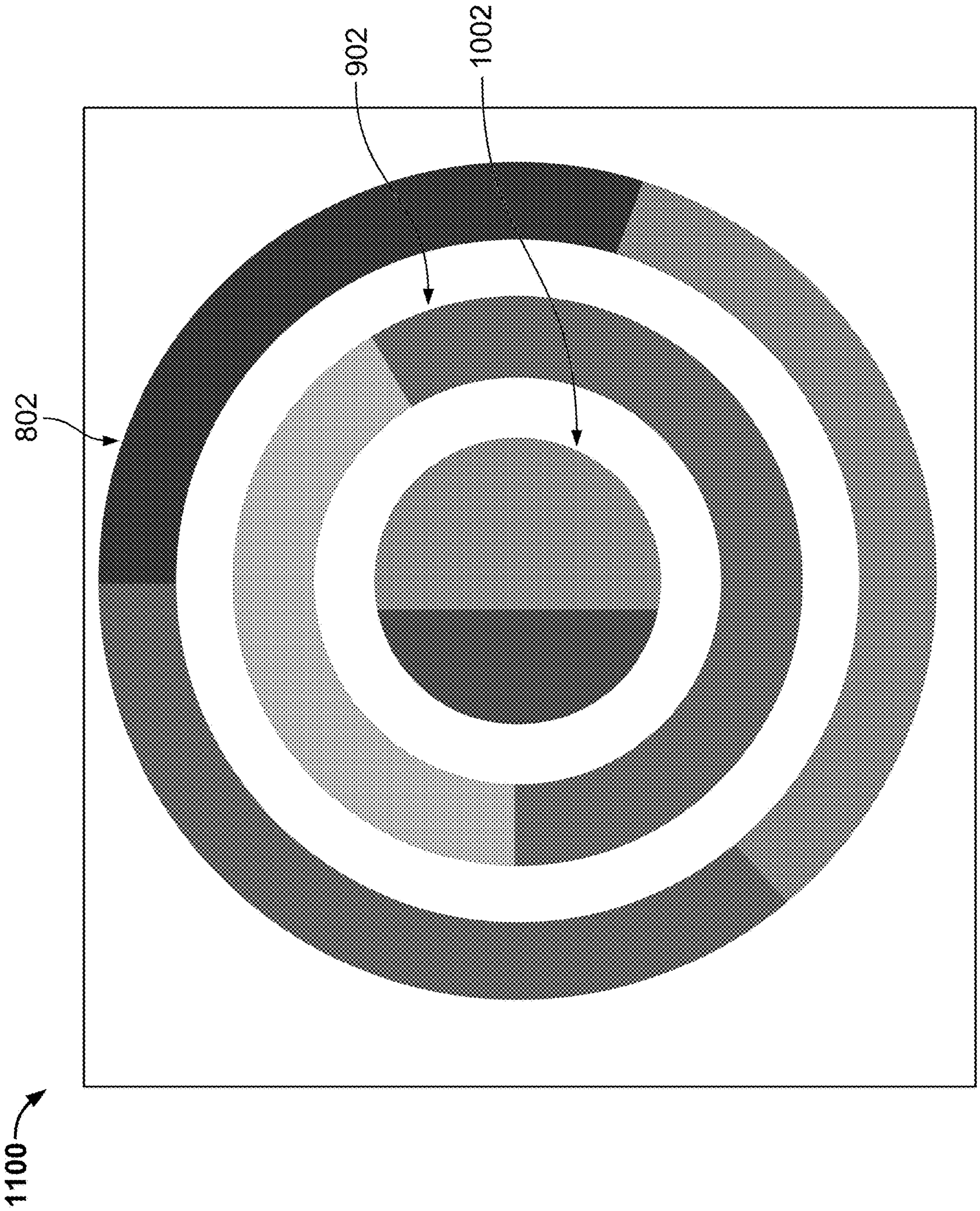
FIG. 11 depicts an exemplary combined radial display, in accordance with an embodiment of the present disclosure.

Referring now to FIG. 11, an exemplary combined radial display 1100 is illustrated and described in further detail. The radial display 1100 includes sensory radial 802, temperament radial 902, and cognitive radial/circle 1002. Accordingly, three separate constructs and components thereof may be displayed simultaneously. The sensory radial 802, temperament radial 902, and cognitive radial 1002 may be "nested," e.g., such that they are positioned concentrically with respect to each other. Additionally, the radials 802 and 902 are positioned such that the radial 802 is an external radial portion that entirely surrounds the internal radial portion 902. To the extent it is convenient to use multiple radials or other visual representations of different components of multiple constructs, example approaches may display components of a first one of the radials using a set of colors that is distinct from a set of colors used in a second one of the radials. For example, the three colors used to show the components of radial 802 may each be different from the components of radial 902. Although not depicted in FIG. 11, some or all of the additional data presentations (e.g., 804, 904, and/or 1004) may be displayed simultaneously with the combined radial view, for example, in response to a user selection of any of the radials or a portion of the combined radial display.

Referring now to FIG. 12, an exemplary comparison matrix 1200 of combined radial displays 1202, 1204 of multiple members of a group is illustrated and described in further detail. Comparison matrix 1200 may include a first display area 1202 relating to a first individual and a second display area 1204 relating to a second individual. Each of the display areas 1202 and 1204 may include combined radial display relating to different respective individuals. Further, explanatory statements may be provided in the display areas 1202 and 1204 regarding the proportions evident from the combined radial displays in each of the display areas 1202 and 1204. These may be modified and selectable, for example, based on user selection of particular radials within the combined radials or other user display elements. In this manner, combined radial displays for multiple individuals may be provided in a single display, e.g., on mobile device 122. Selection of components within the combined radial displays in display areas 1202 and 1204 by a user may cause display of additional information, e.g., the illustrated explanatory statements, combined radial displays for additional individual(s), concrete action items for facilitating collaboration between the individuals, checklists, practice exercises, etc. Explanatory statements may include, as illustrated in FIG. 12, descriptions of one or more constructs, traits within certain constructs and/or how a trait may influence interactions with others, etc. Accordingly, additional data displayed in response to a selection by the user may relate to a particular component associated with a location of the selection by the user. More specifically, selection by a user of a component within one of the combined radial displays may cause display of additional information relating to the same component for another individual. The data associated with the second/additional individual may thus include scores for the same component (s) selected by the user for the first individual.

Figure 13:
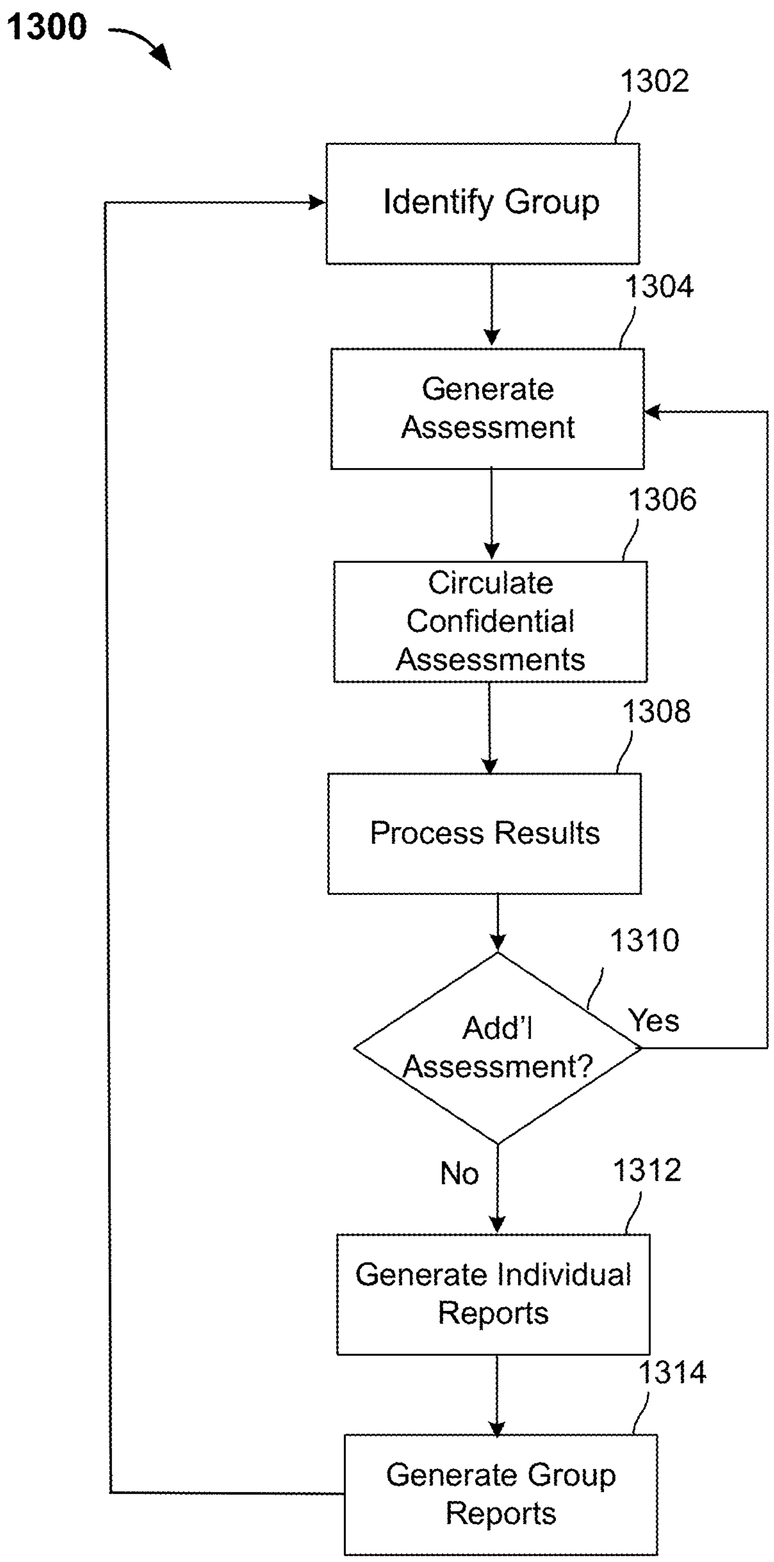
FIG. 13 depicts exemplary steps for collection and analysis of assessment data, in accordance with an embodiment of the present disclosure.

Referring now to FIG. 13, a process 1300 for collection and analysis of assessment data is illustrated and described in further detail. Process 1300 may begin at block 1302.

At block 1302, process 1300 may identify a group, e.g., of a plurality of individuals 102, for which data or reports may be desired. Merely by way of example, a plurality of individuals 124 may be selected from an initial pool of individuals 102, e.g., for consideration for inclusion in a team or management group. In another example, organizations or networks associated with third party data sources 104 may seek to implement a team comprising a subset of individuals 102.

Proceeding to block 1304, process 1300 may generate an assessment relevant to the group 124 selected. For example, assessments or queries may be developed based upon constructs, e.g., sensory, temperament, etc. discussed above. In another example, organizational preferences, requirements, or the like may be used to select one or more constructs to be the focus of an assessment. Process 1300 may then proceed to block 1306.

At block 1306 confidential assessments may be circulated or otherwise administered to individuals 102. For example, assessment quizzes, tests, or the like may be taken by individuals 102 to develop results. Additional information may also be acquired in accordance with privacy requirements and user authorizations, such as from organizational information systems or third-party data systems.

Proceeding to block 1308, process 1300 may normalize data input to servers 110, e.g., via data intake 106. As noted above, in some example approaches values may be normalized relative to comparative data or information. For example, standard deviations may be determined based upon a comparison of values determined in the assessments with broader data sets, e.g., of a larger population or larger set of individuals 102. Process 1300 may then proceed to block 1310.

At block 1310, process 1300 may query whether additional assessment may be desirable or needed. For example, to an extent assessments administered initially to individuals 102 does not generate a sufficient volume of comparative data for values associated with the individuals 102, additional assessments may be administered to the individuals 102 or additional individuals 102 may be administer assessments. If process 1300 determines that additional assessments are needed, process 1300 may return to block 1304 for implementation of additional assessment(s). Otherwise, process 1300 may proceed to block 1312.

At block 1312, process 1312 may generate one or more individual reports. For example, as discussed above one or more representative displays may be generated based upon normalized values associated with a plurality of components for one or more constructs, e.g., as described in FIGS. 3, 8, 9, 10, and/or 11. In some examples, multiple combined display radials may be determined to represent a plurality of constructs of an individual, with each having multiple components.

Proceeding to block 1314, one or more group reports may be generated by process 1300. For example, based upon the individual reports generated in block 1312, comparisons of individuals 102, e.g., under consideration for a team, may be generated to determine an ability of a team of individuals 102 to interact or work together. Merely by way of example, the illustrations set forth above in FIGS. 5-7 provide analysis of the degree to which a given individual may be required to expend additional effort with other individuals based upon the sensory, temperamental, or cognitive traits of those other individuals.

Figure 14:
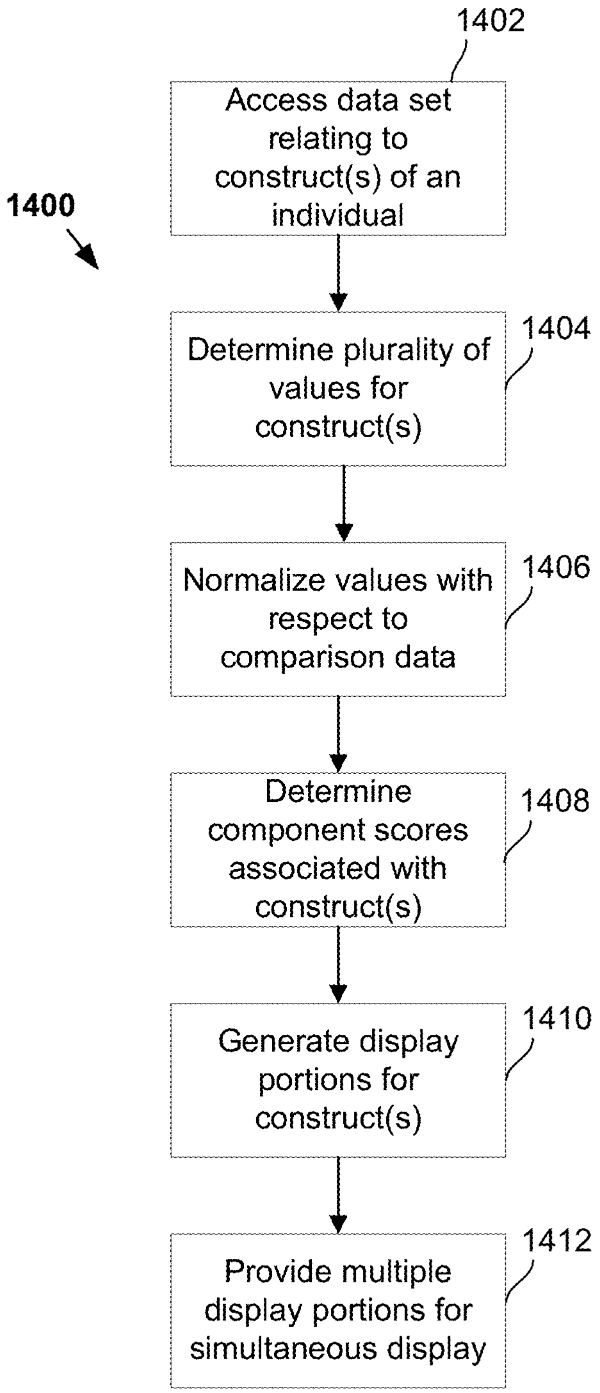
FIG. 14 depicts exemplary steps for generating assessment displays, in accordance with an embodiment of the present disclosure.

Referring now to FIG. 14, an example process for generating one or more assessment displays is illustrated and described in further detail. More specifically, process 1400 may generate a combined presentation format, e.g., for display at a user interface. Process 1400 may begin at block 1402, where process 1400 accesses at least one data set relating to a first construct of an individual and a second construct of the individual. For example, as discussed above data sets may be stored at servers 110, which may include data and values generated from assessments of individuals 102.

Proceeding to block 1404, process 1400 may determine a plurality of values for each construct. For example, as discussed above, values may be determined to represent multiple components for each of a plurality of constructs associated with an individual. More specifically, in some examples described above values may be determined to represent three components of a sensory construct, a balance between two components of a temperament construct, and a balance between two components of a cognitive construct. Accordingly, in these examples multiple values may be determined for each construct. Process 1400 may then proceed to block 1406.

At block 1406, process 1400 may normalize values, e.g., as determined from assessments of individuals 102, with respect to comparison data. For example, a plurality of values may be normalized with respect to comparison data for each of multiple constructs. More specifically, in examples above a standard deviation may be determined for components of each construct. Accordingly, values collected in assessments of individuals 102 may be normalized to facilitate comparison of a given individual to broader pools of individuals 102.

Proceeding to block 1408, process 1400 may determine component score(s), e.g., associated with each construct. For example, as described above component scores may represent a relationship between multiple components of a construct, e.g., a degree to which an individual is disposed toward one of the components to a greater degree than another of the components. In a further example, for a given individual, component scores may be determined with reference to a standard deviation associated with the components of a construct. In some example approaches, normalized component scores may be determined for multiple components of each of a plurality of constructs. Process 1400 may then proceed to block 1410.

At block 1410, process 1400 may generate display portions for each construct, e.g., based upon component scores determined at block 1408. For example, a first display portion may be generated for a first construct. The display portion may distinguish between the components of the construct based on the respective first component score for each of the first components. For example, as discussed above and illustrated in FIG. 8, a radial 802 may be generated which displays three circumferential portions based upon a degree to which the individual 102 is assessed to have auditory, visual, and kinesthetic components of the sensory construct. Further, additional display portions may be generated, e.g., as illustrated in FIGS. 9 and/or 10, based upon component scores of the individual 102 in the temperament and cognitive constructs, respectively. As illustrated and described above regarding FIGS. 9 and 10, display portions may be generated in the form of radials 902 and/or 1002. The radials 902 and 1002 may distinguish between multiple components of their respective constructs based on respective component scores. Process 1400 may then proceed to block 1412.

At block 1412, process 1400 may provide multiple display portions for simultaneous display at a user interface. For example, multiple radials 802, 902, and/or 1002 may be illustrated together, thereby representing component scores for components of multiple constructs for an individual. Further, in some examples, such as illustrated in FIG. 11, three radials 802, 902, and 1002 are displayed together. While the example illustrated in FIG. 11 is directed to a combined radial display relating to three separate constructs for an individual, any number of constructs or components thereof may be employed that are convenient.

In this manner, process 1400 may provide display portions via any user interface that is convenient.

Figure 15:
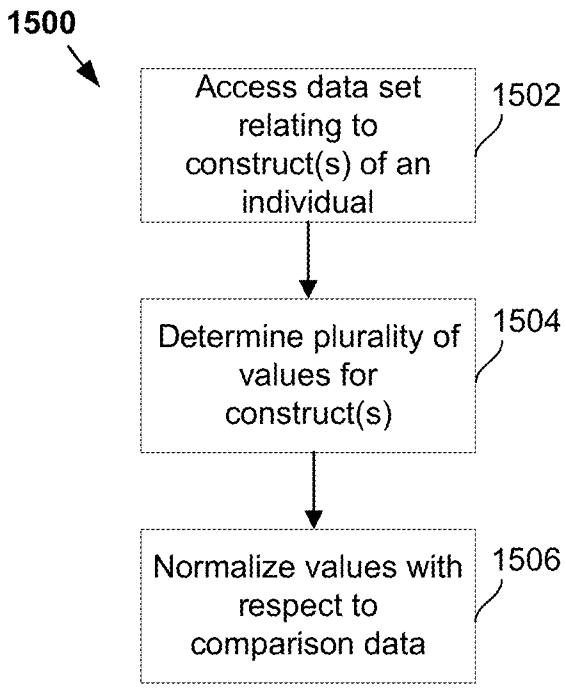
FIG. 15 depicts exemplary steps for performing actions based on assessment results, in accordance with an embodiment of the present disclosure.

Referring now to FIG. 15, an example process 1500 for performing actions based on assessment results is illustrated and described in further detail. Generally, process 1500 may be implemented to facilitate assignments of individuals 102, provide authorizations to physical resources (e.g., rooms, locations, computer systems) and/or virtual resources (e.g., computing resources, virtual rooms, VR rooms, etc.), modify criteria for interaction of individuals (e.g., automatically facilitating different types of interaction interfaces, reserved speaking times, etc.), e.g., based at least in part on data sets or comparisons determined based upon data sets described herein.

Process 1500 may begin at block 1502, where one or more assessment results are input. In one example, combined display presentations may be input for one or more individuals 102, e.g., to illustrate multiple display portions of the individual(s).

Proceeding to block 1504, process 1500 may compare assessment results for one or more individuals 102. For example, the illustrations set forth above in FIGS. 5-7 generally facilitate comparisons of individuals, e.g., to determine a degree to one individual may expend additional effort in interacting with other individuals based upon the sensory, temperamental, or cognitive traits of those other individuals. Process 1500 may then proceed to block 1506.

At block 1506, one or more teams of individuals 102 may be formed and/or access to resources may be granted/restricted, and/or structured interactions may be automatically facilitated, as described herein. For example, individuals 102 may be associated together in a team based on comparison between the individuals 102 and/or other individuals under consideration for the team, e.g., as implemented at block 1504. As another example, individuals within a group may be provided with varying access to physical and/or virtual resources based on particular competencies and assignments. As yet another example, interactions between individuals within a group may be automatically facilitated, such as by providing individualized interfaces tailored for particular individuals and translating those interactions to common results or outputs, or providing for designated times for individuals to interact in group settings. Process 1500 may then terminate.

Figure 16:
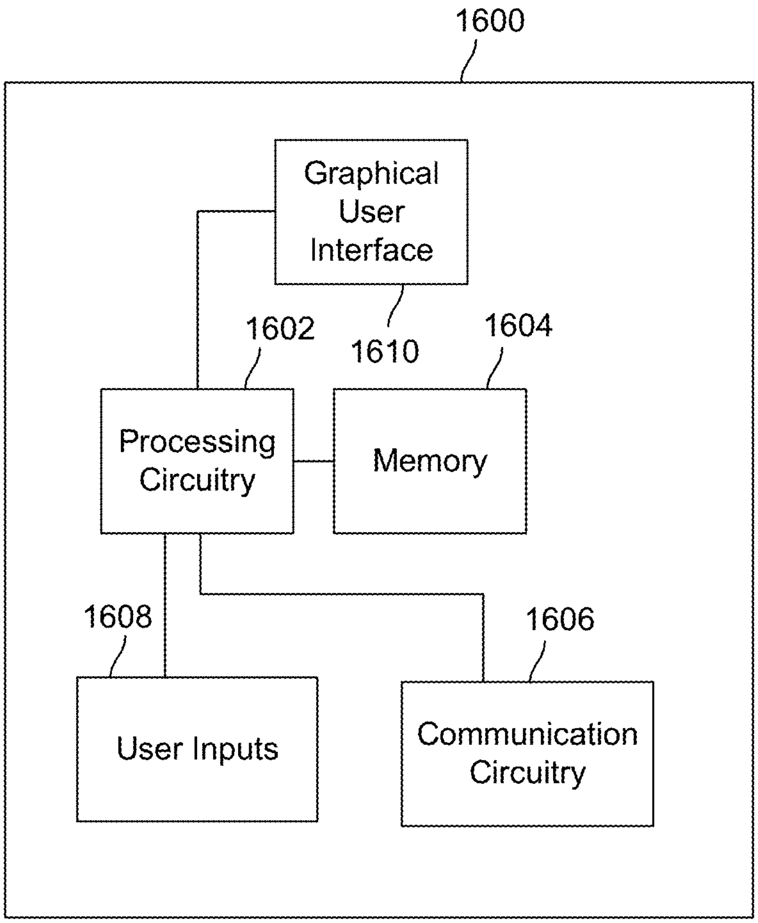
FIG. 16 depicts an exemplary display device, in accordance with an embodiment of the present disclosure.

FIG. 16 depicts an exemplary display device 1600 in accordance with an embodiment of the present disclosure. In an example, mobile device 122 comprises the display device 1600. Generally, display device 1600 may be configured to display multiple display portions, e.g., of a combined radial display such as illustrated and described above in FIG. 11. The display device 1600 may include processing circuitry 1602, memory 1604, communication circuitry 1606, user inputs 1608, and a graphical user interface 1610. While these elements are illustrated separately, it should be understood that multiple of the illustrated components of display device 1600 may be integrated. Merely as one example, processing circuitry 1602 may be integrated with communication circuitry 1606 in a single processor or the like.

Processing circuitry 1602 may generally include one or more components providing necessary processing based on the requirements of the display device 1600. In some embodiments, processing circuitry 1602 may include hardware control logic and/or one or more microprocessors. The processing circuitry 1602 may include suitable hardware and/or software logic necessary to interface with and control the hardware and other components of the display device 1600, such as a hardware configured according to a hardware description language and/or instructions executing on a microprocessor or other circuitry capable of executing instructions. For example, processing circuitry may include a general- or special-purpose microprocessor, finite state machine, controller, computer, central-processing unit (CPU), field-programmable gate array (FPGA), or digital signal processor. Processing circuitry 1602 may run software to perform the operations or processes described herein, including software accessed in machine-readable form on a tangible non-transitory computer-readable storage medium (e.g., flash, RAM, ROM, SRAM, EEPROM, hard drives, etc.) such as memory 1604, as well as software that describes the configuration of hardware such as hardware description language (HDL) software used for designing chips.

Communication circuitry 1606 may include wireless and/or wired circuitry for communicating with other devices. For example, as noted above mobile device 122 may be configured to communicate with servers 110, e.g., to obtain data sets, comparison data, or the like. Exemplary wireless interfaces (e.g., BLE, WiFi, NFC, infrared, Low Power Wide-Area Network, etc.) may provide for local communications, reporting of data, receiving of control instructions, software updates, identification of authorized users, and other functionality as described herein. An exemplary wired communication may include a connector that attaches to other systems such as a charger for bulk data exchange functions, such as data downloads and software updates. In some embodiments, only certain devices may operate as communications hubs or collectors (e.g., utilizing protocols such as Thread or Bluetooth mesh protocols) for communicating with other devices, allowing many of the of the automated beverage dispensing devices to have more limited battery usage, storage, and processing hardware and software requirements.

Processing circuitry 1602 and/or communication circuitry 1606 may be linked with a battery, e.g., any suitable battery type such as a rechargeable lithium ion battery, although in some embodiments (not depicted herein) an enclosed battery compartment may be provided for receiving replaceable batteries. Whatever type of battery or other power source is used, the battery may provide power necessary to operate the other components of the display device 1600.

Graphical user interface 1610 of the display device 1600 may include any user interface that is convenient. As discussed above, in some examples graphical user interface 1610 is a touchscreen, e.g., implemented on mobile device 122. Further, in some examples graphical user interface 1610 may facilitate display of combined presentation data, e.g., to show relationships between components of one or more constructs of an individual. The graphical user interface 1610 may also be configured to receive user inputs, e.g., selections of one or more portions of display areas to select and/or display additional information or data relating to selected portions.

Although a user interface may include particular user interface components (e.g., a touchscreen, one or more buttons and LEDs, etc.) as described in detail herein, it will be understood that a variety of types and methodologies of the user interface 1610 may be employed in accordance with the present disclosure. For example, a miniaturized touch screen display can provide for configurable user inputs and outputs, which may be updated dynamically to employ new functionality. Other types of interface methodologies may be employed as a substitute for or in addition to the touch and display techniques, such as audible messages or warnings, haptic patterns, and/or remote UI performed by auxiliary devices such as adjacent displays (e.g., of smart watches, wearable devices, inventory management or POS systems, smart phones, tablets, etc.) or AR/VR devices.

Although the present disclosure has been described and depicted in the context of particular infrastructure and computing systems, it will be understood that the present disclosure may be implemented within a variety of suitable systems. Computing resources providing for the storage of instructions to be executed and data to be stored, associated, presented, and otherwise processed may be distributed in multiple computing systems and locations, for example, with core system software operating in a cloud or hybrid cloud environment and user-facing applications executing via app, browser, or other interfaces on local computing devices.

This description and the attached materials are merely illustrative of the present disclosure. It will be understood that portions thereof may be modified, combined, expanded, or substituted in a variety of manners. For example, although particular user interface elements are shown in particular combinations, it will be understood that portions of a particular user interface may be substituted within other user interfaces, to create combined additional user interface display options. Such user interfaces may be adjusted and scaled for a variety of presentation mediums, including augmented and virtual reality displays. As an example, radials of the present disclosure may be provided in such an interface, with associated data accessible via selection of a radial or portion thereof.

While this disclosure has discussed its data processing, linking, storing, and transmission techniques in the context of assessment of particular constructs (e.g., related to personality assessments) and particular associated transactions, it will be understood that the improved data processing techniques described herein can be applied to other types of assessment data and other transactions related to such assessment data (e.g., any psychometric survey, group/sub-group data, demographic data or any other data that has a statistically valid large data set which transforms additive multi-factor components and constructs to this more comparative methodology allowing much more granular and accurate individual, group, sub-group, strategy, task or resource comparisons). For example, access to physical and/or virtual resources may be granted or denied (e.g., at a granular level) based on normalized scores and/or normalized combinations of scores in comparison with defined criteria, including relative values of scores and/or combinations of scores compared to existing linked subjects associated with the resource (e.g., a determination that adding an individual having particular normalized scores to a group having access to particular resources will not increase group volatility beyond an acceptable level, a comparative analysis between non-human factors which would prioritize components among issues such that different ranges of resource allocation could be evaluated for statistical likelihood of success, etc.).

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A method for providing a combined presentation format to a user interface for a user, the method implemented by a system comprising processing circuitry configured to process data and one or more databases comprising processing and memory, the method comprising:

accessing, via the processing circuitry, at least one data set relating to a first construct of an individual and a second construct of the individual, wherein the at least one data set is stored in the one or more databases, and wherein the first construct and the second construct each include a respective characteristic, type of characteristic, or set of characteristics of the individual;

determining, by the processing circuitry, from the at least one data set, a first plurality of values for the first construct and a second plurality of values for the second construct;

normalizing, by the processing circuitry, the first plurality of values with respect to first comparison data for the first construct;

normalizing, by the processing circuitry, the second plurality of values with respect to second comparison data for the second construct;

determining, by the processing circuitry, for each of a first plurality of components associated with the first construct, a first component score from the normalized first plurality of values;

determining, by the processing circuitry, for each of a second plurality of components associated with the second construct, a second component score from the normalized second plurality of values;

generating, by the processing circuitry, a first display portion for the first construct, wherein the first display portion distinguishes between the first components based on the respective first component score for each of the first components;

generating, by the processing circuitry, a second display portion for the second construct, wherein the second display portion distinguishes between the second components based on the respective second component score for each of the second components; and providing the first display portion and the second display portion for simultaneous display at the user interface;

wherein respective portions of the first display portion associated with each first component are proportional to the respective scores for each first component, and wherein respective portions of the second display portion associated with each second component are proportional to the respective scores for each second component; and wherein the first display portion comprises an external radial portion, the second display portion comprises an internal circle portion, and wherein the external radial portion entirely surrounds the internal circle portion to visually represent a first whole of the first construct as a circumference about the circle, and wherein a second whole of the second construct is visually represented as the internal circle portion.

2. The method of claim 1, wherein the individual is a first individual, and the at least one data set comprises at least an additional data set, and wherein the additional data set is for a second individual for comparison with the first individual.

3. The method of claim 2, wherein the at least one data set comprises a set of survey responses, and wherein the comparison data set includes at least a subset of the set of survey responses.

4. The method of claim 1, wherein at least one of the normalizing the first plurality of values or the normalizing the second plurality of values is based on a standard deviation of each component compared to a base data set for the component.

5. The method of claim 1, wherein the first display portion distinguishes between the first components with a first set of different colors for each of the first components.

6. The method of claim 5, wherein the second display portion distinguishes between the second components with a second set of different colors for each of the second components, and wherein all of the first set of colors are distinct from the second set of colors.

7. The method of claim 1, further comprising:

determining, from the at least one data set, a third plurality of values for a third construct;

normalizing the third plurality of values with respect to third comparison data for the third construct;

determining, for each of a third plurality of components associated with the third construct, a third component score from the normalized third plurality of values;

generating a third display portion for the third construct, wherein the third display portion distinguishes between the third components based on the respective third component score for each of the third components; and providing the third display portion for simultaneous display with the first display portion and the second display portion at the user interface of the user.

8. The method of claim 7, wherein respective portions of the third display portion associated with each third component are proportional to the respective scores for each third component, wherein the third display portion comprises a middle radial portion, wherein the external radial portion surrounds the middle radial portion and the internal circle portion, and wherein the middle radial portion surrounds the internal circle portion.

9. The method of claim 8, wherein the first construct comprises a sensory construct, the second construct comprises a cognitive construct, and the third construct comprises a temperament construct.

10. The method of claim 9, wherein the first components comprise a kinesthetic component, a visual component, and an auditory component, wherein the second components comprise a process component and an outcome component, and wherein the third components comprise an introverted component and an extroverted component.

11. The method of claim 1, further comprising:

receiving a user selection at a location within the first display portion or the second display portion;

determining, based on the user selection, additional display information to provide to the user interface; and providing the additional display information for simultaneous display with the first display portion and the second display portion.

12. The method of claim 11, wherein the additional display information comprises detailed information about one of the first components or one of the second components.

13. The method of claim 11, wherein the individual is a first individual, and wherein the additional display information comprises comparison data relative to a second individual.

14. The method of claim 13, wherein the comparison data corresponds to one of the first components or the second components associated with the location.

15. The method of claim 13, wherein the additional display information comprises a narrative description.

16. A system for providing a combined presentation format for a user, comprising:

a user interface comprising a display area; and processing circuitry communicatively linked with the user interface, the processing circuitry configured to:

access at least one data set relating to a first construct of an individual and a second construct of the individual, wherein the first construct and the second construct each include a respective characteristic, type of characteristic, or set of characteristics of the individual;

determine, from the at least one data set, a first plurality of values for the first construct and a second plurality of values for the second construct;

normalize the first plurality of values with respect to first comparison data for the first construct;

normalize the second plurality of values with respect to second comparison data for the second construct;

determine, for each of a first plurality of components associated with the first construct, a first component score from the normalized first plurality of values;

determine, for each of a second plurality of components associated with the second construct, a second component score from the normalized second plurality of values;

generate a first display portion for the first construct, wherein the first display portion distinguishes between the first components based on the respective first component score for each of the first components;

generate a second display portion for the second construct, wherein the second display portion distinguishes between the second components based on the respective second component score for each of the second components; and provide the first display portion and the second display portion for simultaneous display at the display area of the user interface;

wherein respective portions of the first display portion associated with each first component are proportional to the respective scores for each first component, and wherein respective portions of the second display portion associated with each second component are proportional to the respective scores for each second component; and wherein the first display portion comprises an external radial portion, the second display portion comprises an internal circle portion, and wherein the external radial portion entirely surrounds the internal circle portion to visually represent a first whole of the first construct as a circumference about the circle, and wherein a second whole of the second construct is visually represented as the internal circle portion.

17. The system of claim 16, wherein the user interface comprises a touchscreen including the display area.

* * * * *